(12) United States Patent
Christenson et al.

(10) Patent No.: US 6,574,721 B1
(45) Date of Patent: Jun. 3, 2003

(54) APPARATUS AND METHOD FOR PROVIDING SIMULTANEOUS LOCAL AND GLOBAL ADDRESSING USING SOFTWARE TO DISTINGUISH BETWEEN LOCAL AND GLOBAL ADDRESSES

(75) Inventors: Patrick James Christenson, Lake City, MN (US); Brian Eldridge Clark, Rochester, MN (US); Michael J. Corrigan, Rochester, MN (US); Paul LuVerne Godtland, Rochester, MN (US); Richard Karl Kirkman, Rochester, MN (US); Donald Arthur Morrison, Rochester, MN (US); Scott Alan Plaetzer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,343

(22) Filed: Aug. 31, 1999

(51) Int. Cl.$^7$ ............................................. G06F 12/06
(52) U.S. Cl. ..................... 711/209; 711/203; 711/112; 711/163; 711/206
(58) Field of Search ................................. 711/203, 204, 711/205, 206, 207, 209, 111, 112, 113, 114, 152, 163; 395/309; 709/201, 215, 216; 707/10

(56) References Cited

U.S. PATENT DOCUMENTS 5,613,071 A * 3/1997 Rankin et al. ................ 707/10
5,852,716 A * 12/1998 Hagersten .................... 709/201

(List continued on next page.)

OTHER PUBLICATIONS

Tanenbaum, "Structured Computer Organization" 2nd ed., © 1984, pp. 10–12.*

Tanenbaum, "Structured Computer Organization", © 1984, Prentice–Hall, Inc., p. 11.*

*Primary Examiner*—Matthew Kim
*Assistant Examiner*—B. R. Peugh
(74) *Attorney, Agent, or Firm*—Martin & Associates, LLC; Derek P. Martin

(57) ABSTRACT

An apparatus and method provide simultaneous local and global addressing capabilities in a computer system. A global address space is defined that may be accessed by all processes. In addition, each process has a local address space that is local (and therefore available) only to that process. An address space processor is implemented in software to perform system functions that distinguish between local addresses and global addresses. In the preferred embodiments, the local address space has a size that is a multiple of the size of a segment of global address space. When the hardware indicates a page fault, the address space processor determines whether the address being translated is a local address or a global address. If the address is a local address, the address space processor uses a local directory to process the page fault. If the address is a global address, the address space processor uses a global directory to process the page fault. When the hardware indicates an addressing error because a computed address crosses a global segment boundary, the address space processor determines whether the address is a local address or a global address. If the address is a global address, the address space processor indicates an addressing error. If the address is a local address, the address space processor determines whether the address is within the process' local address space, and indicates an addressing error if the address is outside the process' local address space. Instructions are allowed to operate on both local and global addresses because the address space processor handles either type of address whenever software assistance is required, such as for servicing a page fault or checking a segment boundary crossing. In addition, the address space processor dynamically checks the addressing compatibility of called code before passing control to the called code.

35 Claims, 21 Drawing Sheets

U.S. PATENT DOCUMENTS

| | | | | |
|---|---|---|---|---|
| 5,862,357 A | * | 1/1999 | Hagersten et al. | 395/309 |
| 5,887,138 A | * | 3/1999 | Hagersten et al. | 709/215 |
| 5,896,501 A | * | 4/1999 | Ikeda et al. | 711/203 |
| 5,923,847 A | * | 7/1999 | Hagersten et al. | 711/152 |
| 5,940,870 A | * | 8/1999 | Chi et al. | 709/216 |
| 6,101,590 A | * | 8/2000 | Hansen | 711/203 |
| 6,256,715 B1 | * | 7/2001 | Hansen | 711/163 |

* cited by examiner

GLOBAL ADDRESSING

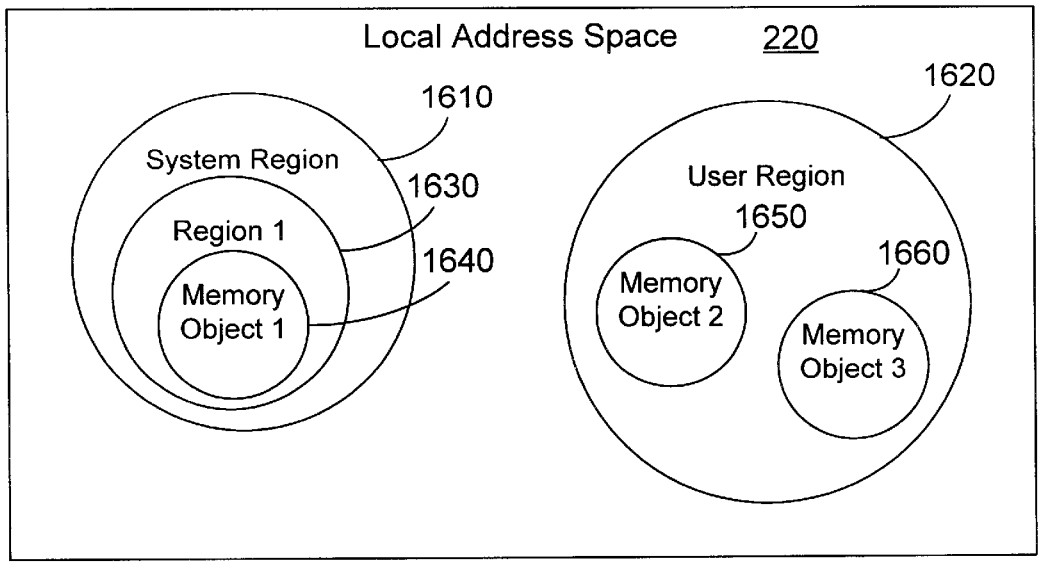
FIG. 16
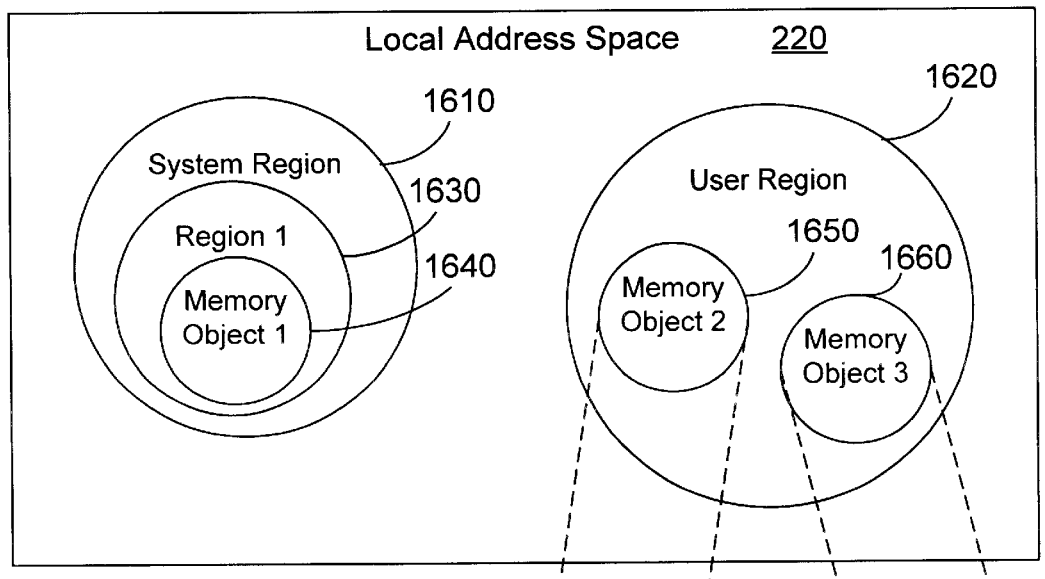
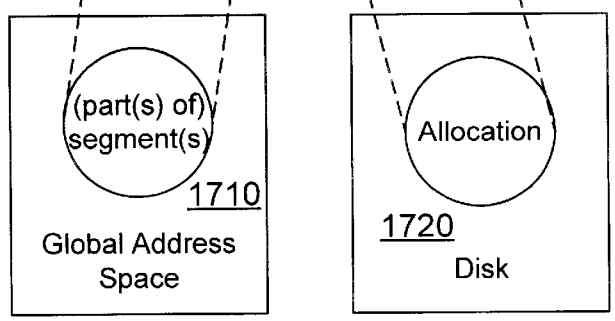
FIG. 17

Space Pointer (accessible by customer code)

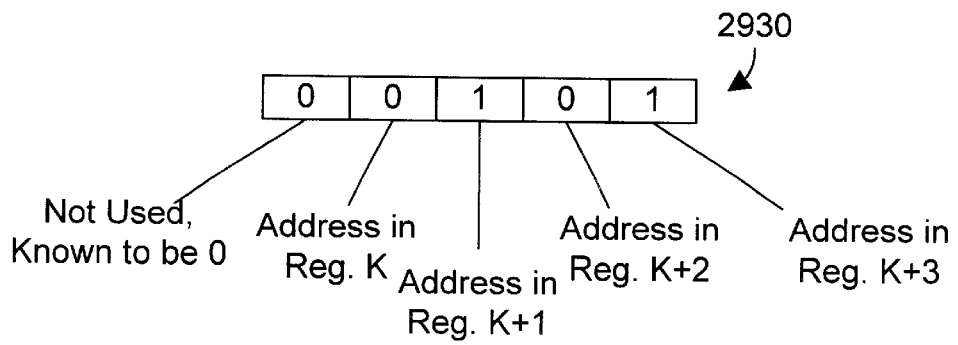
PRIOR ART  FIG. 29
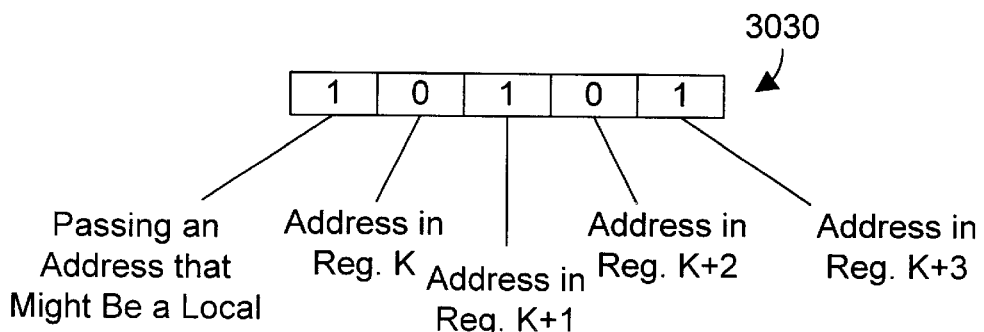
FIG. 30
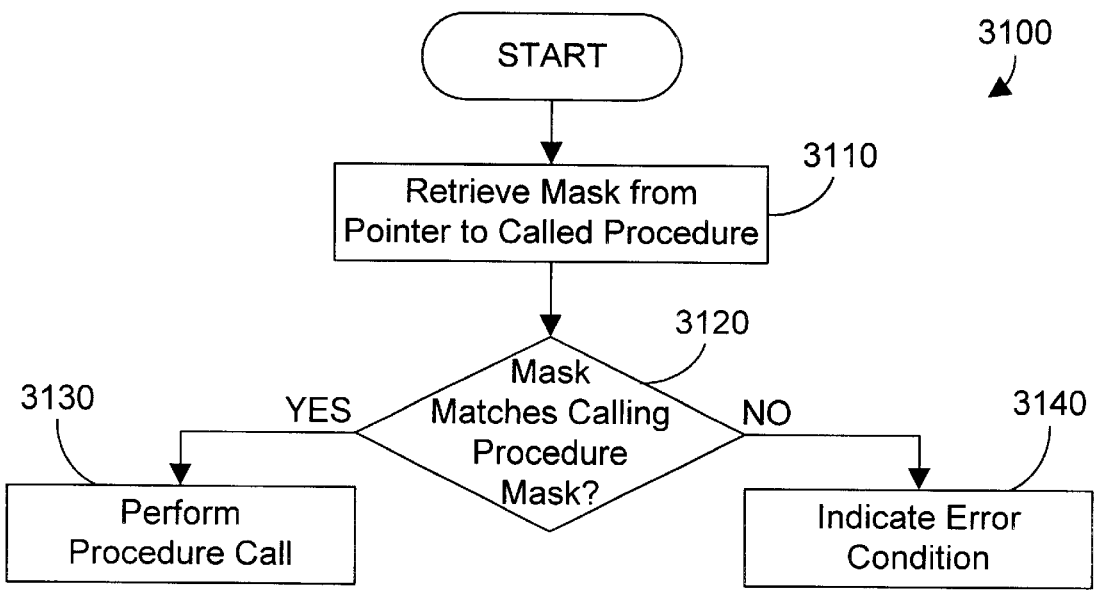
FIG. 31

APPARATUS AND METHOD FOR PROVIDING SIMULTANEOUS LOCAL AND GLOBAL ADDRESSING USING SOFTWARE TO DISTINGUISH BETWEEN LOCAL AND GLOBAL ADDRESSES

BACKGROUND OF THE INVENTION

1. Technical Field

The present invention relates in general to the data processing field. More specifically, the present invention relates to the field of addressing schemes in computer systems.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems have addressing capabilities that are defined by the computer hardware. The address space of a computer system is the range of addresses available to reference data, instructions, etc., and is determined by the size (in bits) of the address. The address size is one of the fundamental architectural features of a computer system. Early computer systems were single-user computers that could handle only a single task at a time, mapping all data into a single address space, and swapping data into and out of the address space whenever a new task needed to be performed. Later, computers were developed that supported multiple users and processes. A computer system that supports multiple processes must manage the allocation of the address space among the different processes. Because the addresses needed for all the processes that might run on a computer system typically exceeds the physical address space defined by the address, a separate address space is typically allocated to each process, resulting in multiple virtual address spaces. This type of addressing is known as "local addressing", because each process has its own virtual address space that is local to the process, and cannot be seen by other processes.

In a local addressing scheme, having multiple virtual address spaces mapped onto a physical (real) address space may very well result in a physical address being mapped to the same virtual address in different processes. When a process is loaded into main memory, a mapping mechanism maps virtual addresses in the virtual address space of the process to physical addresses in the memory of the computer system. This mapping function increased the complexity of the operating system that had to perform the virtual address mapping, but was required to allow multiple virtual address spaces to exist that are collectively larger than the physical address space.

An alternative addressing scheme to local addressing is known as "global addressing", where one address space is used that is sufficiently large that it can be divided up among processes without overlapping between them. The benefit of a global addressing scheme is that programs and data in a computer system can be assigned persistent, unique logical addresses in the large system address space. Because these logical addresses are not duplicated, they can be used to identify data either in main memory or in secondary memory, such as on a hard disk drive. Examples of computer systems that use global addressing schemes are the IBM System/38 computer system formerly manufactured and distributed by IBM Corporation, the IBM AS/400 computer system currently manufactured and distributed by IBM, and the Opal system developed at the University of Washington. For additional background concerning the IBM System/38 and IBM AS/400 system, see IBM System/38 Technical Developments (IBM, 1978); IBM Application System/400 Technology (IBM, 1988); and IBM Application System/400 Technology Journal, Version 2 (IBM, 1992). The Opal system is described in a series of academic papers, including J. Chase et al., "Opal: A Single Address Space System for 64-bit Architectures", Proc. IEEE Workshop on Workstation Operating Systems (April 1992).

Current IBM AS/400 computer systems can operate in different modes. When an AS/400 system is operating in single address space mode, it operates with global addressing. When an AS/400 system is operating in multiple address space mode, it operates with local addressing. While the AS/400 system supports either of these addressing schemes, it currently does not support both of them at the same time. Once the mode is set, the addressing scheme is set until the mode is changed at a later time. Without an apparatus and method for providing simultaneous local and global addressing, the computer industry will continue to suffer from the requirement of selecting either local or global addressing to the exclusion of the other.

DISCLOSURE OF INVENTION

According to the present invention, an apparatus and method provide simultaneous local and global addressing capabilities in a computer system. A global address space is defined that may be accessed by all processes. In addition, each process has a local address space that is local (and therefore available) only to that process. An address space processor is implemented in software to perform system functions that distinguish between local addresses and global addresses. In the preferred embodiments, the local address space has a size that is a multiple of the size of a segment of global address space. When the hardware indicates a page fault, the address space processor determines whether the address being translated is a local address or a global address. If the address is a local address, the address space processor uses a local directory to process the page fault. If the address is a global address, the address space processor uses a global directory to process the page fault. When the hardware indicates an addressing error because a computed address crosses a global segment boundary, the address space processor determines whether the address is a local address or a global address. If the address is a global address, the address space processor indicates an addressing error. If the address is a local address, the address space processor determines whether the address is within the process' local address space, and indicates an addressing error if the address is outside the process' local address space. Instructions are allowed to operate on both local and global addresses because the address space processor handles either type of address whenever software assistance is required, such as for servicing a page fault or checking a segment boundary crossing. In addition, the address space processor dynamically checks the addressing compatibility of called code before passing control to the called code. By providing both global and local addressing, the apparatus and method of the present invention provide great flexibility in addressing, allowing a computer program to benefit from the advantages of both addressing modes.

The foregoing and other features and advantages of the invention will be apparent from the following more particular description of preferred embodiments of the invention, as illustrated in the accompanying drawings.

BRIEF DESCRIPTION OF DRAWINGS

FIG. 16 is a block diagram of a logical view of items within a local address space;

FIG. 17 is a block diagram showing how two of the items in FIG. 16 are mapped to underlying storage;

FIG. 29 is a block diagram showing a prior art addressing mask that is used in a procedure pointer in an IBM AS/400 computer system;

FIG. 30 is a block diagram showing an addressing mask in accordance with the preferred embodiments; and FIG. 31 is a flow diagram of a method for using the mask of FIG. 30 at run-time to determine whether or not to pass control to a called procedure.

BEST MODE FOR CARRYING OUT THE INVENTION

Overview

Figure 1:
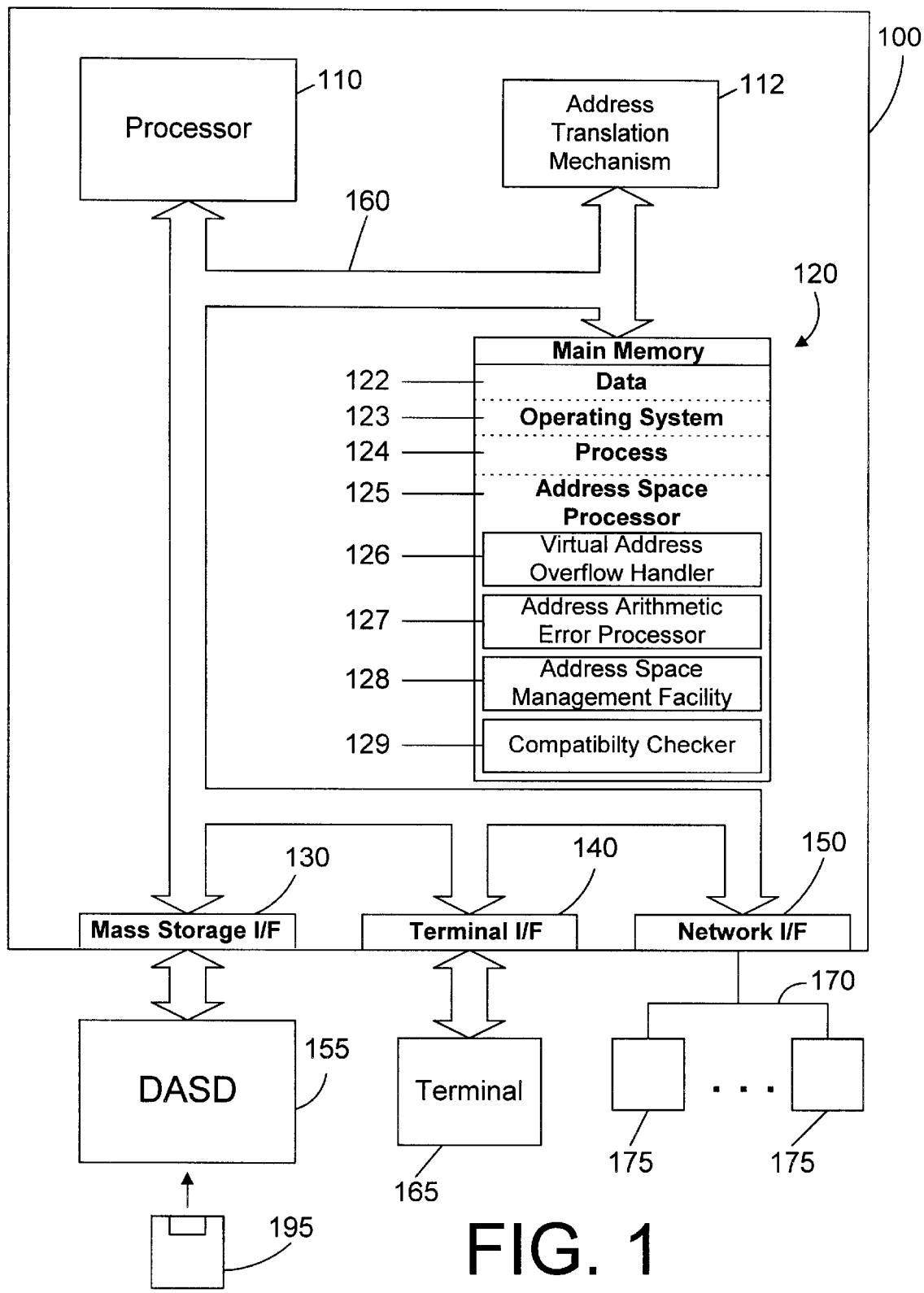
FIG. 1 is a block diagram of a computer apparatus in accordance with preferred embodiments of the present invention.

The present invention simultaneously provides local and global addressing in a single computer system. For those who are not familiar with the general concepts of local and global addressing and their advantages and disadvantages, these two addressing schemes are discussed in more detail below, along with definitions used herein.

Definitions

In discussing addressing modes, the same terms have been used in the art to represent different things to different people. For example, the term "virtual address" as most commonly known in the art refers to an address that may be accessed or that is derived by performing an address calculation, and that is visible to, and can be manipulated by, an executing program. However, this type of virtual address is referred to as an "effective address" in PowerPC terminology. A "virtual address" in PowerPC terminology is an address that is generated from an effective address and that is used internally in the PowerPC address translation scheme. This type of address is referred to herein as an "internal address" to indicate that this address is not visible to the programmer, but is an address that is generated and used by the address translation mechanism. A "real address" in PowerPC terminology is an address that is used to access real (or physical) memory, and is referred to herein as a "physical address". Generally speaking, for the discussion herein, an instruction accesses a virtual address, which is translated to an internal address, which is further translated to a physical address, as discussed in more detail below.

Local Addressing

Local addressing is the prevailing addressing paradigm in today's computer systems. Typically, each process has an address range that is the same for all processes. Address to data mappings are local to each process even though each process has the same address range. Data must be mapped into a process address space in order to be accessible, so data that will be accessed by more than one process must be mapped for each process that will use it. Whenever the processor switches between threads of execution in different processes, the address translation structures that convert from virtual to physical addresses must be managed. For example, the set of local mappings between virtual and physical addresses must be switched, and any hardware facility that speeds up address translation, such as a lookaside buffer, must have its entries invalidated. Otherwise, since the addresses for each process look the same as each other, the speed up facility could map an address to the wrong physical memory, which would produce the wrong data. Next, any address translation speedup facility must be primed with the known mappings for the new process, or else this facility will have to be filled as necessary with the new mappings. This lookaside buffer "miss" processing can slow down performance even more than the priming, yet if priming is done, each address space switch suffers its costs, even though many of the address translation entries may not be used before the next switch to a different local address space. In summary, extra work occurs for local addressing paradigms to share data and/or share the hardware facilities involved in address translation for accessing data.

Global Addressing

Global addressing is a wholly different paradigm than local addressing. The IBM AS/400 computer is a very popular computer system that uses global addressing. In a global addressing scheme, all processes share the same address space. Address to data mappings are global and may persist beyond the life of the process. This means that when the processor switches between threads of execution, there is no need to change mappings so there is no extra overhead associated with managing address translation facilities. Further, if the mapping from address to data is persistent, at a higher logical level addresses can be used directly as identifiers, to refer to objects (chunks of data with defined allowable operations) without the need to use some lookup facility like a table to map between an identifier and an object. On the other hand, a means must exist to control use of global addresses, to prevent all programs from accessing any data. This requires a system structure that can either control generation of global addresses or can check rights for all accesses to data. On the AS/400 computer system, the system structure ensures that executable code (and so generation of global addresses by code) is generated by a system component. This special code generator must insert hardware instructions to validate addresses—instructions that would not be necessary in a purely local addressing paradigm. In addition, global addressing necessarily imposes limitations on the number of objects that can be addressed over time and on the maximum size of any object, because of the fundamental computer implementation and architecture needs to limit address size. Further, the key advantage of global accessibility of data actually inhibits or complicates some data uses that are inherently local. Also, global addressing provides for only one view of data accessibility from a hardware perspective. That is, different processes running with the same security privileges cannot have different storage protection characteristics for the same data in a purely global paradigm.

Known global address spaces, such as the address space defined on the IBM AS/400 computer system, are typically divided into a predetermined number of equal-sized "segments". In the AS/400 computer system, a global address segment comprises 16 megabytes (MB). A hardware address translation mechanism is provided that detects whenever a computed address lies outside the current segment, and generates an interrupt to signal an addressing error.

Detailed Description

According to preferred embodiments of the present invention, an apparatus and method allow simultaneous local and global addressing in a computer system using software to distinguish between local addresses and global addresses.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110 connected to an address translation mechanism 112, a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Address translation mechanism 112 is hardware that performs translation of virtual addresses to physical addresses, and that indicates addressing errors when a computed address lies outside the current global segment. In the preferred embodiment, the address translation mechanism 112 is a prior art mechanism that is used in existing IBM AS/400 computer systems, which only provide global addressing (i.e., single address mode). In other words, address translation mechanism 112 has no knowledge of local addressing in single address space mode.

Main memory 120 in accordance with the preferred embodiments contains data 122, an operating system 123, one or more processes 124, and an address space processor 125. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, process(es) 124, and an address space processor 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Process 124 is made up of program instructions that are executed by processor 110, along with related data structures.

Figure 11:
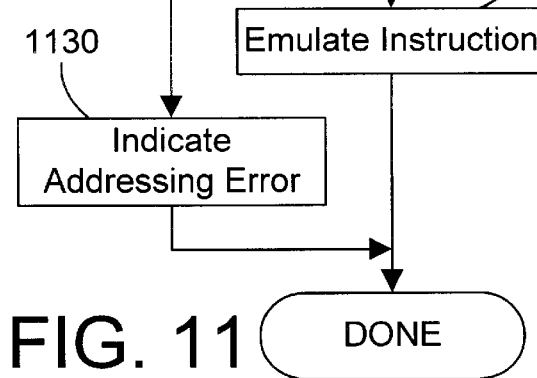
FIG. 11 is a flow diagram of step 1030 shown in FIG. 10.

Address space processor 125 preferably includes a virtual address overflow handler 126, an address arithmetic error processor 127, an address space management facility 128, and a compatibility checker 129. As stated above, the hardware address translation mechanism 112 has no knowledge of any local addressing while operating in single address mode, so the virtual address overflow handler 126 determines whether an addressing error indicated by the hardware address translation mechanism 112 is caused by a valid local address or an invalid address, whether local or global. The steps performed by the virtual address overflow handler 126 are shown in FIG. 11 and discussed in more detail below.

The address arithmetic error processor 127 evaluates explicit address computations used to update the value of a pointer, determines whether an address is local or global, then compares the result of the computation to predefined boundaries for the local and global address that are based on the initial address used in the computation. If the result of the computation is a global address and is in the same global segment as the initial address, no address error is indicated. Similarly, if the result of the computation is a local address and is in the same local address space as the initial address, no address error is indicated. Note that in the preferred embodiments, the global segment size is 16 MB, while the local segment size (i.e., the size of each local address space) is 1 terabyte (TB).

Address space management facility 128 is used to map memory objects within a local address space to physical storage, and provides both a logical and physical view of local address space. The details of address space management facility 128 are discussed below with reference to FIGS. 16–21.

Compatibility checker 129 is used to determine whether called code has addressing capabilities that are compatible with the calling code. This allows many programs that cannot handle local addresses to still inter-operate with newer programs that process both global and local addresses in many cases. When modules in a computer program are being linked or bound together (i.e., at bind-time), the calls within the program are analyzed, and if the compatibility checker 129 can resolve the reference to the called program at this time, the compatibility checker 129 determines whether the called program supports local addresses, and if a local address can be passed as a parameter via register to the called code, an error condition is indicated, and a binding error is indicated. If the addressing capabilities are compatible, or if no local addresses can be passed as parameters via register, the calls are allowed at bind-time. Compatibility checker 129 also performs checking for compatible addressing modes at activation-time, i.e., when a program is loaded (prepared for execution). At activation-time, compatibility checker 129 may resolve some references to other programs that could not be resolved at bind-time. For example, in the AS/400 computer system, calls into service programs are not resolved until activation time. Compatibility checker 129 determines whether the called program supports local addresses, and if a local address can be passed as a parameter via register to the called code, an error condition is indicated, and an activation error is indicated. Compatibility checker 129 also checks for addressing compatibility at run-time for procedure calls that cannot be resolved until run-time. If the addressing mode of the called code is compatible with the addressing mode of the calling code, or if the addressing modes are incompatible but no incompatible addresses are passed as parameters via registers, control is passed to the called code. If the addressing mode of the called code is incompatible and if a local address is passed as a parameter via register, an error is indicated, and control is not passed to the called code. More details regarding the operation of the compatibility checker 129 in accordance with the preferred embodiments are discussed below with reference to FIGS. 28–31.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, address translation mechanism 112, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
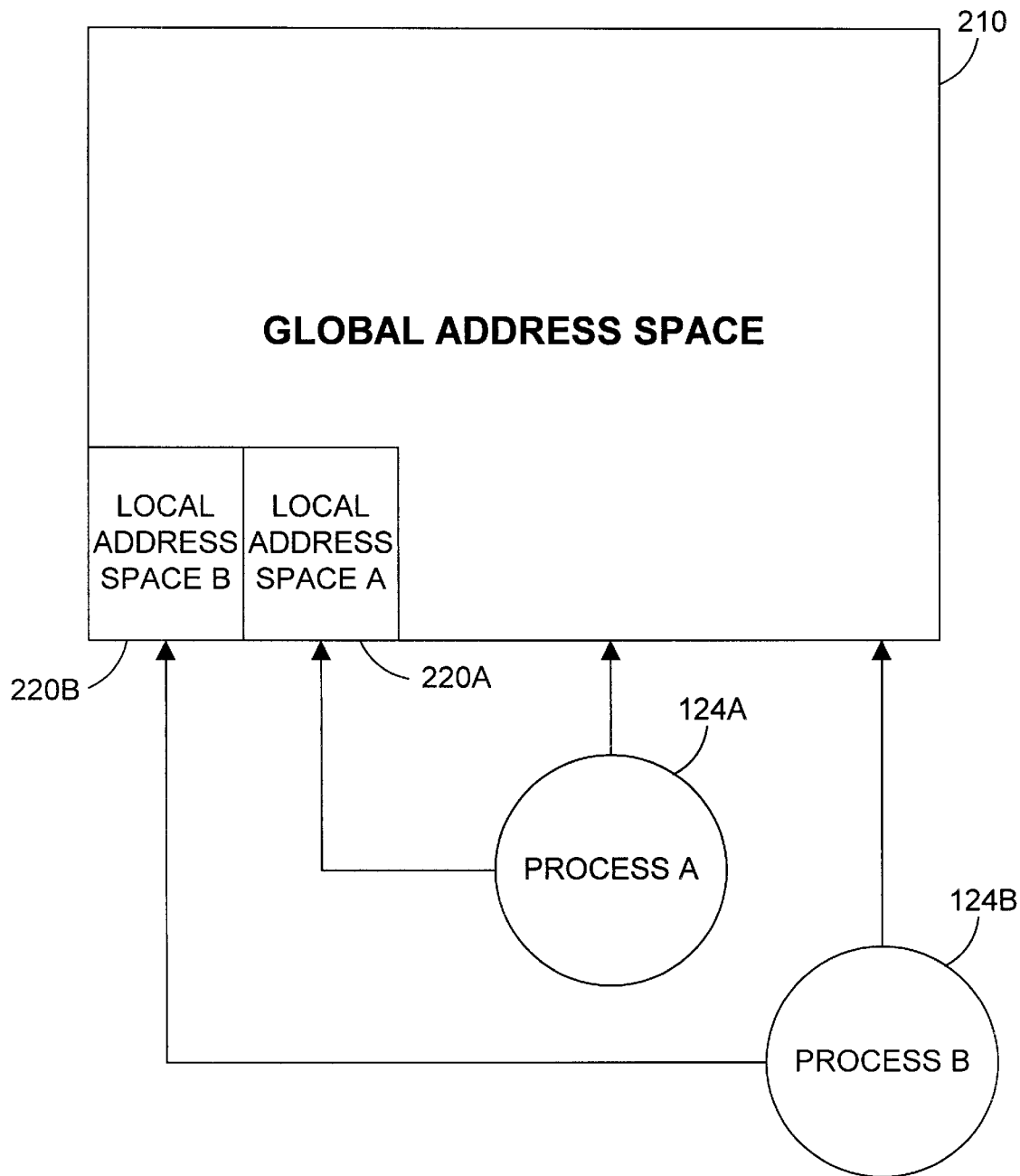
FIG. 2 is a block diagram showing how different processes can access both local and global address space in accordance with the preferred embodiments.

Referring to FIG. 2, a block diagram illustrates how different processes in the preferred embodiments can access a common global address space while at the same time accessing a dedicated local address space as well. Note that the address spaces in FIG. 2 could be mapped to occupy any portion of the full address space defined by processor 110. Process A (124A) can access global address space 210, and can also access its local address space 220A. Similarly, process B (124B) can access global address space 210, and can also access its local address space 220B. In the preferred embodiments, each process has its own corresponding local address space. Each process is able to access both global address space 210 and its corresponding local address space 220 without using any special instructions or compiler directives to set or determine the addressing mode. The addressing mode is determined dynamically as an instruction is executed, by an address space processor 125 that is implemented in software, such as within operating system 123, or within microcode instructions.

Note that FIG. 2 shows the local address spaces 220A and 220B residing in a portion of the global address space 210 to conceptually illustrate that all local address spaces reside within the overall addressing capability of the processor 110. However, once a portion of global address space 210 is allocated for local address spaces, this local portion is no longer usable as global address space, but is instead reserved for use as local address space.

Figure 3:
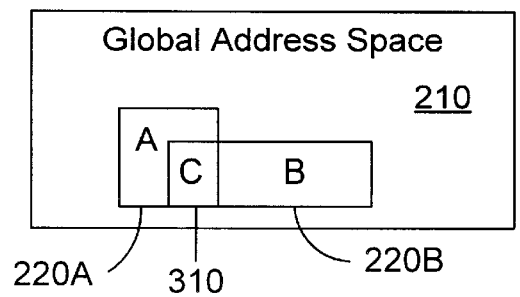
FIG. 3 is a block diagram showing how different processes can access the same or different memory in accordance with the preferred embodiments.

FIG. 2 is shown to conceptually distinguish between global and local address spaces, and to graphically illustrate that a process can access both global and local address spaces. FIG. 3 illustrates how the address spaces in FIG. 2 might map to memory. Note that the term "memory" includes any device that is mapped to an address that is accessible to processor 110 of FIG. 1, including address translation mechanism 112, main memory 120, direct access storage device 155, network interface 150, etc. Global address space 210 defines a block of addresses that access a portion of memory defined by the box labeled "Global Address Space" in FIG. 3. Virtual address space A defines a block of addresses that access a portion of memory defined by the box 220A. Virtual address space B defines a block of addresses that access a portion of memory defined by the box 220B.

The areas labeled with letters in FIG. 3 may be accessed from one or more address spaces, as discussed below. Some of the same locations in memory may be accessed using different addresses. For example, the memory in the area labeled "A" can be accessed using a global address in global address space 210, or using a local address in local address space A (220A). Area B of memory may be accessed using a local address in local address space B (220B), or using a global address in global address space 210. Area C represents an intersection of local address spaces 220A and 220B, and may be thus be accessed using a global address in global address space 210, using a local address in local address space A (220A), or using a local address in local address space B (220B). In addition, it is possible to map multiple address ranges in a local address space to a single area of memory.

Figure 4:
FIG. 4 is a block diagram showing a logical view of memory available to a process.

While the mappings of memory to address spaces are shown in FIG. 3, a logical view of available address spaces for a given process is shown in FIG. 4. We assume for this example that a process may access global address space 210 as well as its own local address space 220. Each process in a system would therefore preferably have access to both the global address space 210 and a local address space 220, as shown in FIG. 4. Note, however, it is equally within the scope of the preferred embodiments to provide processes that access only global address space 210 or only their own local address space 220. In addition, it is within the scope of the preferred embodiments to provide multiple local address spaces for a process, and a process can therefore address any combination of global and local address spaces.

Figure 5:
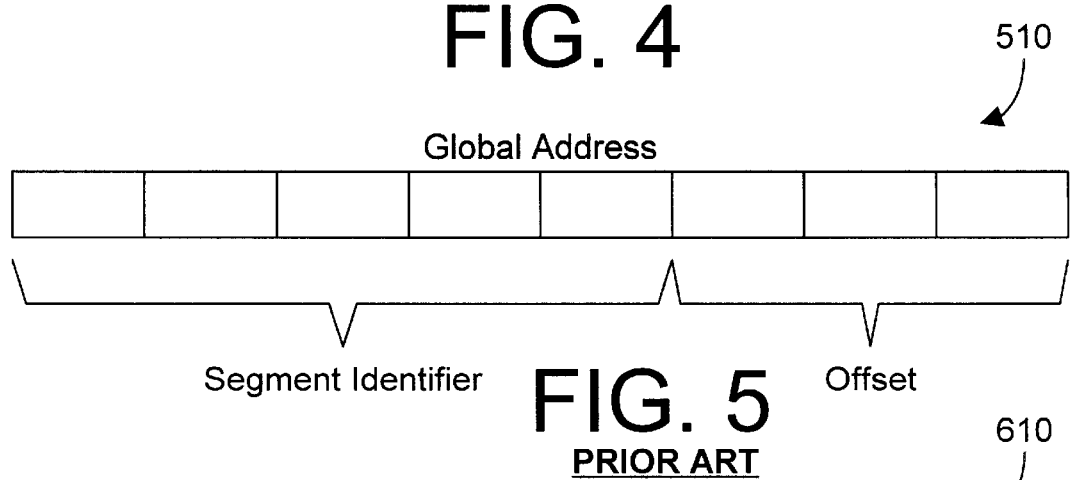
FIG. 5 is a block diagram showing a global address in accordance with the preferred embodiments.
Figure 7:
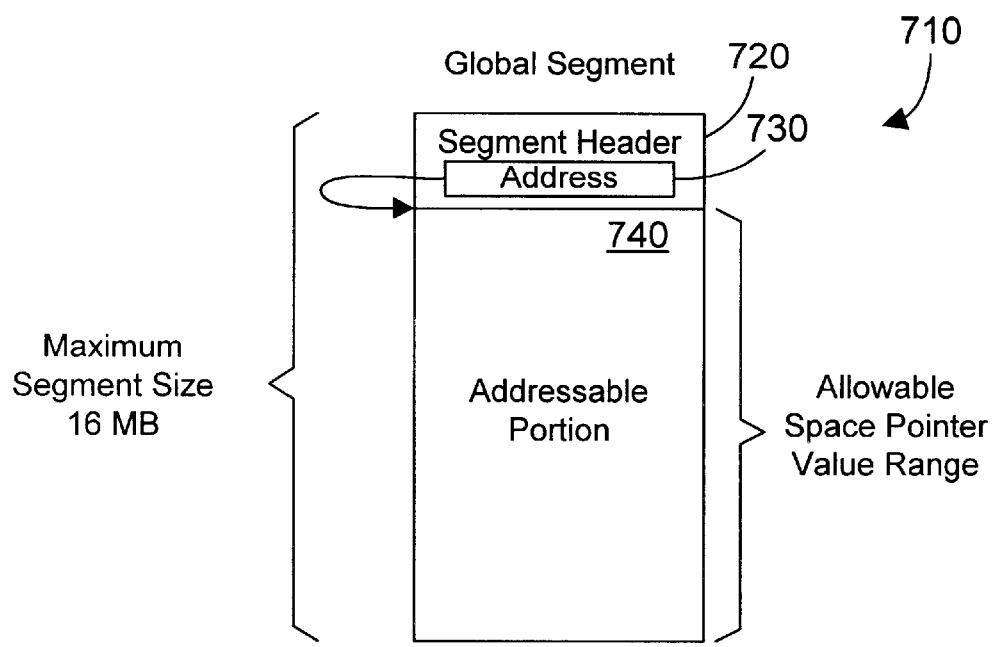
FIG. 7 is a block diagram showing a 16 MB global segment that is used in an IBM AS/400 computer system.

In the AS/400 computer system, the processor currently defines eight bytes of address, with each byte comprising eight bits. Referring to FIG. 5, the components of a global address 510 include a five byte segment identifier and a three byte offset. Because three bytes of the global address are the offset, each global segment is $2^{24}$, or 16 MB in size. One example of a global segment for the global address 510 of FIG. 5 is shown in FIG. 7.

A global segment 710 includes a segment header 720 and, if it will be addressable by a space pointer, an addressable portion 740. Segment header 720 includes an address 730 at a fixed offset that points to the beginning of the addressable portion 740. This configuration allows the size of the segment header 720 to vary. Addressable portion 740 defines the addresses within this segment that applications may access, typically using special pointers known as "space pointers". A space pointer can take on any value within the addressable portion 740 to provide byte-level accessibility to storage, but cannot take on any value within the segment header 720. Segment header 720 may only be accessed by the system software, such as selected portions of the operating system 123 (FIG. 1). The global address in FIG. 5 and the corresponding global segment in FIG. 7 both illustrate the prior art as practiced in the IBM AS/400 computer system.

Figure 6:
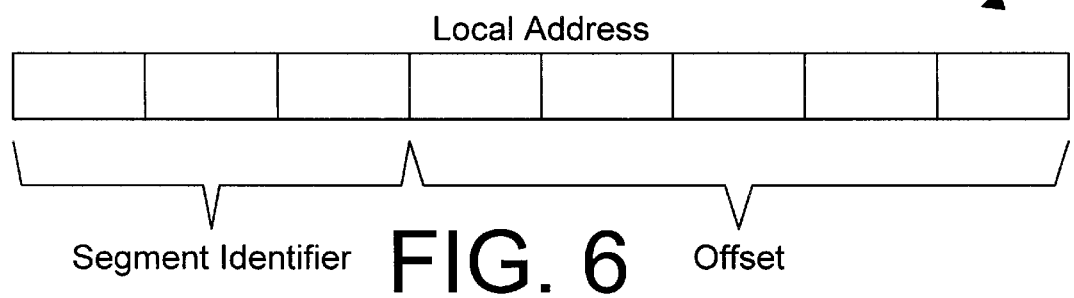
FIG. 6 is a block diagram showing a local address in accordance with the preferred embodiments.
Figure 8:
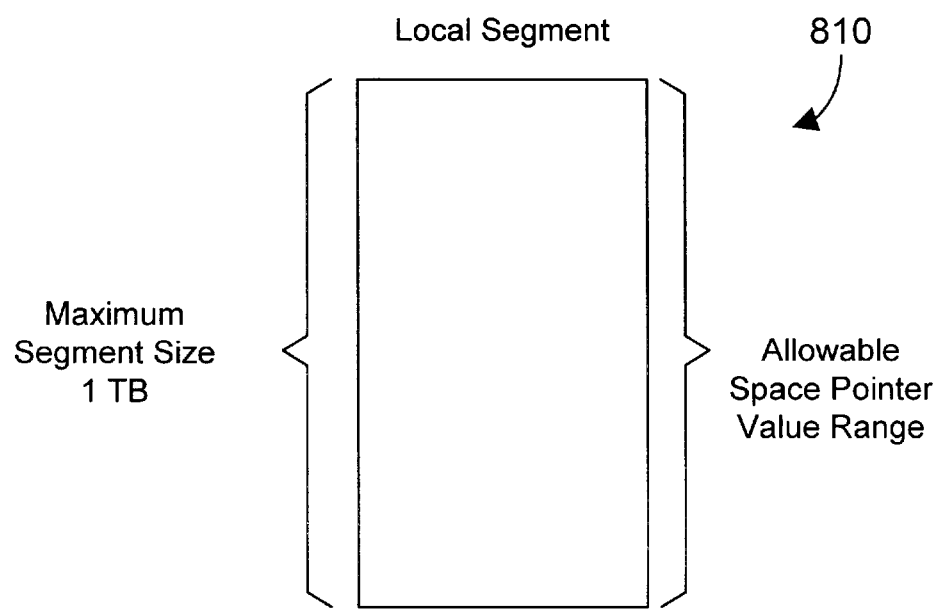
FIG. 8 is a block diagram showing a 1 TB local segment that is used in the preferred embodiments.

Referring to FIG. 6, a local address 610 in accordance with the preferred embodiments includes a three byte segment identifier and a five byte offset, resulting in a $2^{40}$, or 1 TB global addressing range for each local segment. One example of a local segment for the local address 610 of FIG. 6 is shown in FIG. 8. The size of the local segment 810 is 1 TB, and all of these addresses in this range can be accessed by applications. In the preferred embodiments, however, some portion of this (such as the first 16 MB) may be reserved to maintain compatibility with existing code, such as code that uses null pointer values.

Figure 9:
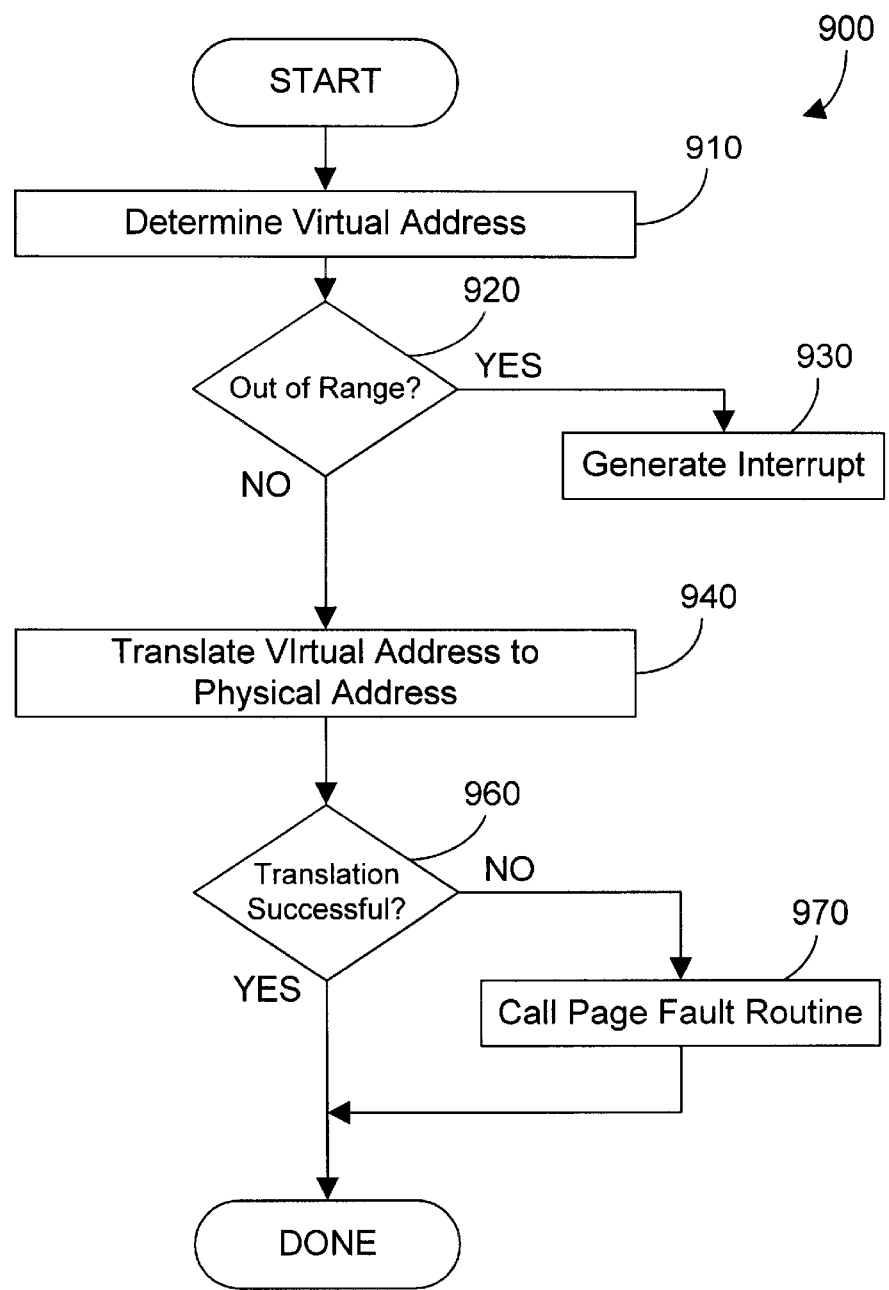
FIG. 9 is a flow diagram showing a prior art method for mapping a virtual address to a physical address in a global addressing scheme.

To best understand the preferred embodiments of the invention, the prior art method 900 in FIG. 9 for performing global addressing in an AS/400 computer system is first considered. Note that the flow diagram of FIG. 9 is a great simplification of the many and complex steps used to perform global addressing, and simply presents some high-level concepts for the purpose of comparing and contrasting the preferred embodiments from the prior art. Referring to FIG. 9, a method 900 for performing global addressing in accordance with known addressing techniques begins by determining a virtual address (step 910), and determining whether the virtual address is out of range (step 920). The virtual address in step 910 may be a fixed address, or may be an address that is derived by performing some address computation. A computed virtual address is out of range if it spans beyond a segment (subdivision) boundary defined within global addresses. To determine whether a virtual address is out of range, the base address plus displacement is computed. The base address plus displacement plus length of the data being accessed is also computed. If either of these addresses a global segment different than the global segment addressed by the base address, then the virtual address is out of range. If the virtual address is out of range (step 920= YES), an interrupt is generated (step 930) to indicate an addressing error. If the virtual address is not out of range (step 920=NO), the virtual address is translated to a physical address (step 940). One known method of translating a virtual address to a physical address uses a page table that pairs a virtual address to its corresponding physical address. If the address translation in step 940 is successful (step 960=YES), method 900 is done. If the translation is not successful (step 960=NO), this means that the page that contains the physical address was not in memory, and method 900 then calls a page fault routine (step 970) to try to load the page into memory.

Figure 10:
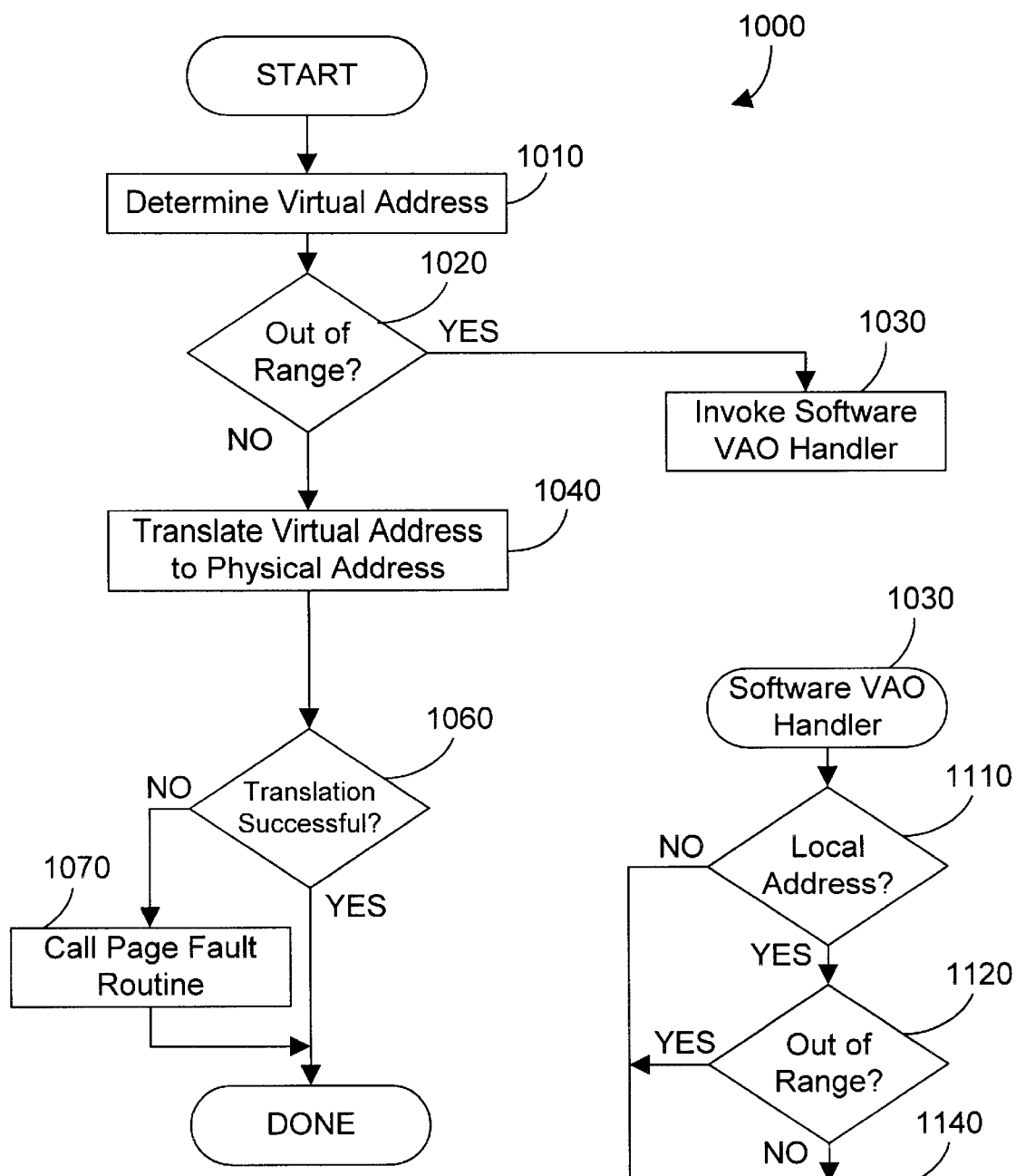
FIG. 10 is a flow diagram showing a method for mapping a virtual address to a physical address in accordance with the preferred embodiments.

Referring now to FIG. 10, a method 1000 for performing global addressing in accordance with the preferred embodiments has steps 1010, 1020, 1040, 1060, and 1070 that are analogous to the respective steps 910, 920, 940, 960, and 970 of FIG. 9. Of course, the steps in FIG. 10 could perform additional or different functions than the steps described in FIG. 9 within the scope of the preferred embodiments. One significant difference between method 900 of FIG. 9 and method 1000 of FIG. 10 is how an out of range address is handled. As described above, if the virtual address in step 910 is out of range (step 920=YES), step 930 generates an interrupt to indicate an addressing error. However, in method 1000, if the virtual address in step 1010 is out of range (step 1020=YES), step 1030 invokes a virtual address overflow (VAO) handler, which is executable code that determines what action to take on an address overflow, rather than simply indicating an addressing error. Note that step 1020 (like step 920) checks to see if the virtual address lies outside the current 16 MB segment. The software virtual address overflow handler 1030 is shown in more detail in FIG. 11.

When the software virtual address overflow handler 1030 is invoked, it first determines whether the virtual address in step 1010 is a local address (step 1110). Throughout this specification, there are many references to different steps that must determine whether an address is local or global. One suitable way to quickly determine whether an address is local or global is by mapping a portion of high global address space as reserved for local addresses. For example, the left-most four bits (nibble) of the address in the preferred embodiment is 1001 in binary (or 9 in decimal) for local addresses and some other value for global addresses. This simple approach allows testing for a local address by looking at a single nibble in the address.

If the virtual address is not a local address (step 1110=NO), the address is global, and the virtual address overflow means there has been an addressing error, which is then indicated (step 1130). Throughout this specification, there are many different references to "indicate addressing errors" or other errors. One suitable way to indicate errors in accordance with the preferred embodiments is to generate a hardware interrupt to processor 110 (FIG. 1) to inform a process of the error. Another suitable way is to return a null pointer value, which cannot be used to reference storage. Of course, many other ways of indicating an error are possible, and the preferred embodiments expressly extend to any and all ways of indicating an error, whether presently known or developed in the future.

If the address is local (step 1110=YES), the local address is then checked to see if it is out of range. Note that the segment size for local address space is 1 TB, so the out of range test in step 1120 checks to see if the address lies outside of the current 1 TB local address space. If the local address is out of range (step 1120=YES), an addressing error is indicated (step 1130). To determine whether a local address is out of range, the base address plus displacement is computed. The base address plus displacement plus length of the data being accessed is also computed. If either of these addresses a local segment different than the local segment addressed by the base address, then the virtual address is out of range. If the local address is not out of range of the local segment (step 1120=NO), this means that the address spans outside of the 16 MB segment (step 1020=YES), but lies within the larger 1 TB local segment (step 1120=NO). Note, however, that in the preferred embodiments, step 1020 is a hardware-generated decision based on whether or not the address lies within the current 16 MB segment (because the hardware only knows about 16 MB global segments). In order to perform the operation that generated an address that is out of range in step 1020 but in range in step 1120, the operation needs to be emulated (step 1140) by other instructions that do not generate an out of range address in step 1020. For example, if a load instruction loads eight bytes from memory at an address where the first four bytes of the data reside in the last four bytes of a 16 MB segment, and the last four bytes of the data reside in the first four bytes of the next 16 MB segment, this load instruction can be emulated in step 1140 without generating an out of range condition in step 1020 by executing two separate load instructions, with each loading four bytes from each of the 16 MB segments. In this manner, step 1140 emulates an instruction that generated an out of range condition in step 1020 by generating one or more instructions that perform similar functions without generating the out of range condition in step 1020.

Figure 12A:
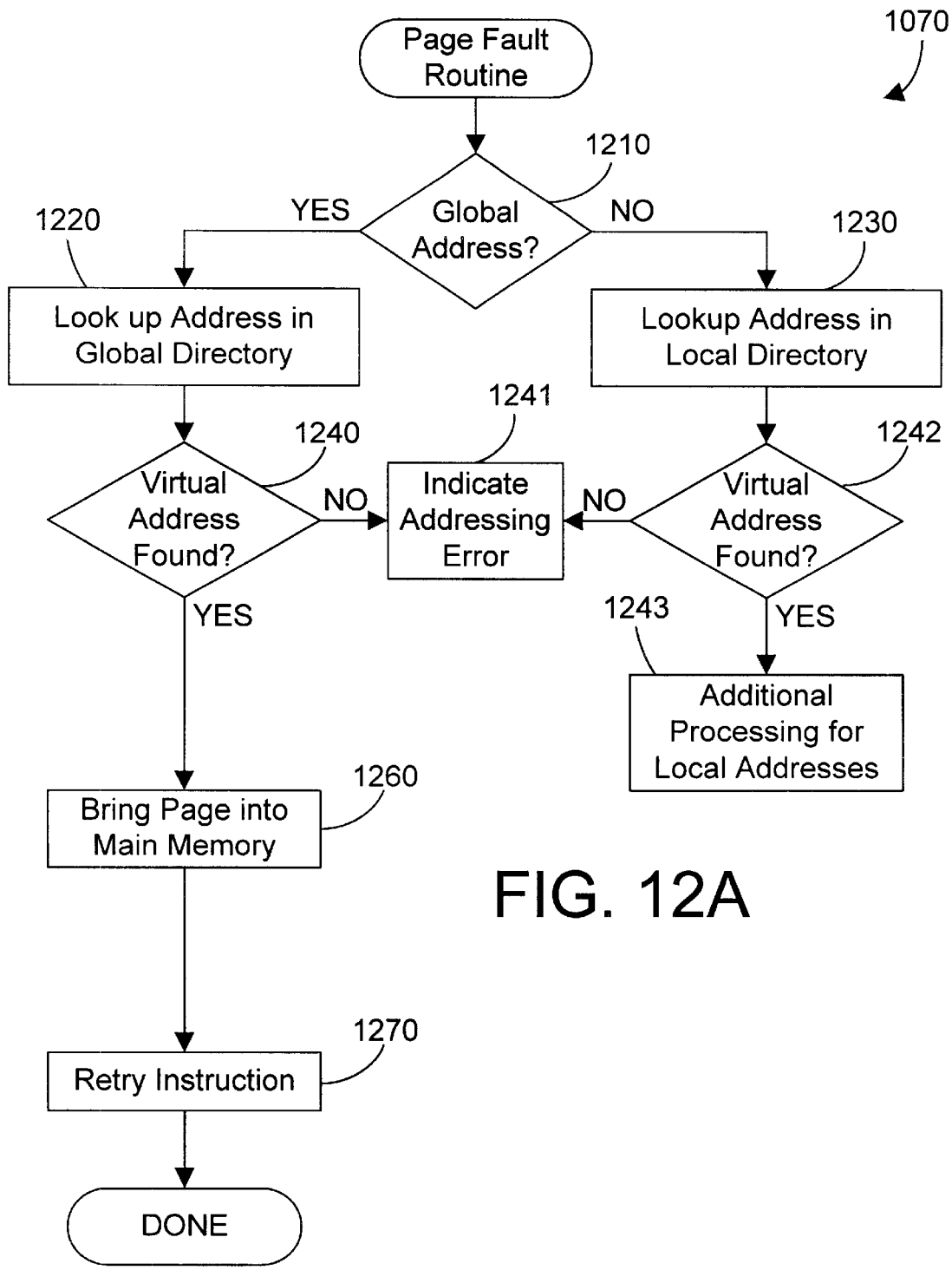
FIGS. 12A and 12B are each portions of a flow diagram of the page fault routine invoked in step 1070 of FIG. 10.

The addition of local addresses creates new demands on the page fault routine that attempts to load pages from memory. Referring to FIG. 12A, a page fault routine 1070 in accordance with the preferred embodiments begins by determining whether the address is a global address or a local address (step 1210). If the address is local (step 1210=NO), the page fault routine 1070 attempts to lookup the virtual address in the local directory (step 1230). The local directory referenced in step 1230 is a directory of all local addresses that are defined for the currently executing process. If the address is global (step 1210=YES), step 1220 attempts to lookup the virtual address in the global directory. The global directory referenced in step 1220 is a directory of all global addresses that are defined on the computer system. If the virtual address is not found in its appropriate directory in step 1220 or step 1230 (step 1240=NO or step 1242=NO), the page fault routine 1070 indicates an addressing error (step 1241). If the virtual address is found in the global directory in step 1220 (step 1240=YES), then the memory that includes the global virtual address is brought into main memory (step 1260). Once the page that contains the virtual address is in main store in step 1260, the instruction is retried (step 1270) by executing method 1000 in FIG. 10, but the next time through, the translation in step 1060 will be successful, and the virtual address can then be accessed in main memory.

In the preferred embodiments, a local address is called an alias if another address (global or local) is mapped to it. If no other address is mapped to the local address, it is not an alias. Global addresses are never aliases.

Figure 12B:
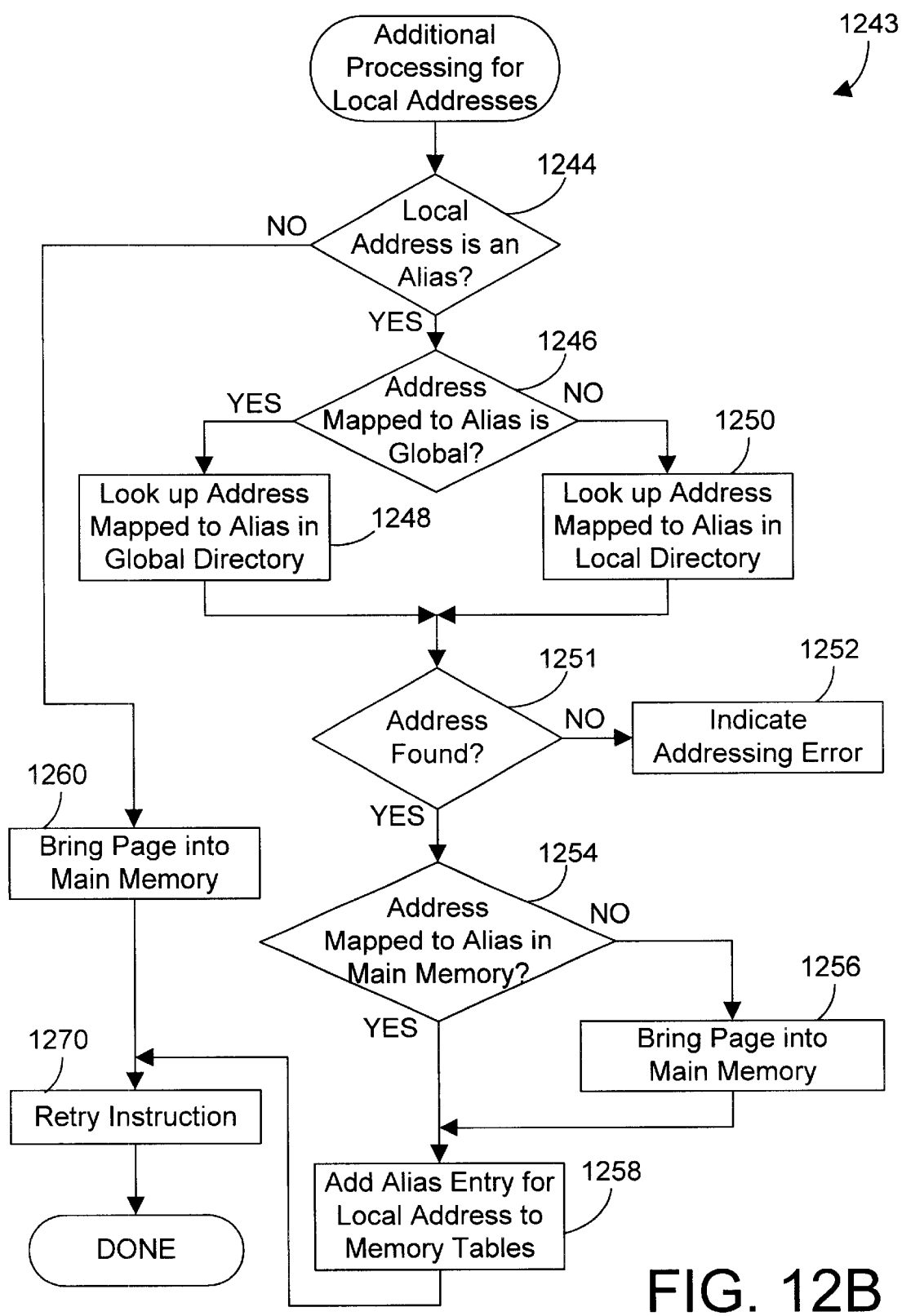

If the virtual address is found in the local directory in step 1230 (step 1242=YES), then additional processing 1243 must be done for the address, as shown in FIG. 12B. In the additional processing 1243, the page fault routine 1070 must determine if the local address is an alias (step 1244). If it is not an alias (step 1244=NO), then the page of memory that includes the local virtual address is brought into main memory (step 1260). Once this page is in main memory in step 1260, the instruction is retried (step 1270) by executing method 1000 in FIG. 11, but the next time through the translation in step 1060 will be successful, and the virtual address can then be accessed in main memory.

If the local address is an alias (step 1244=YES), then the address for which it is an alias is checked to see if it is a global or local address (step 1246). If the address is global (step 1246=YES), step 1248 attempts to look up this address in the global directory. If the address is a local address (step 1246=NO), step 1250 attempts to look up this address in the local directory (step 1250). If the address for which the local address is an alias is not found in its appropriate directory in step 1248 or step 1250 (step 1251=NO), the page fault routine 1070 indicates an addressing error (step 1252). If an address is found (step 1251=YES), page fault routine 1070 next determines if the address that is mapped to the alias is in main memory (step 1254). If not (step 1254=NO), the page that includes the address that is mapped to the alias is brought into main memory (step 1256). Once this page is in main memory, an alias entry for the local address is added to the memory tables (step 1258) to indicate that the page containing the address mapped to the alias is now resident in main store. At this point the instruction is retried (step 1270), which results in method 1000 of FIG. 10 being performed again, but this time the translation in step 1060 will be successful (because the address now resides in main memory), so no page fault will be generated.

Figure 13:
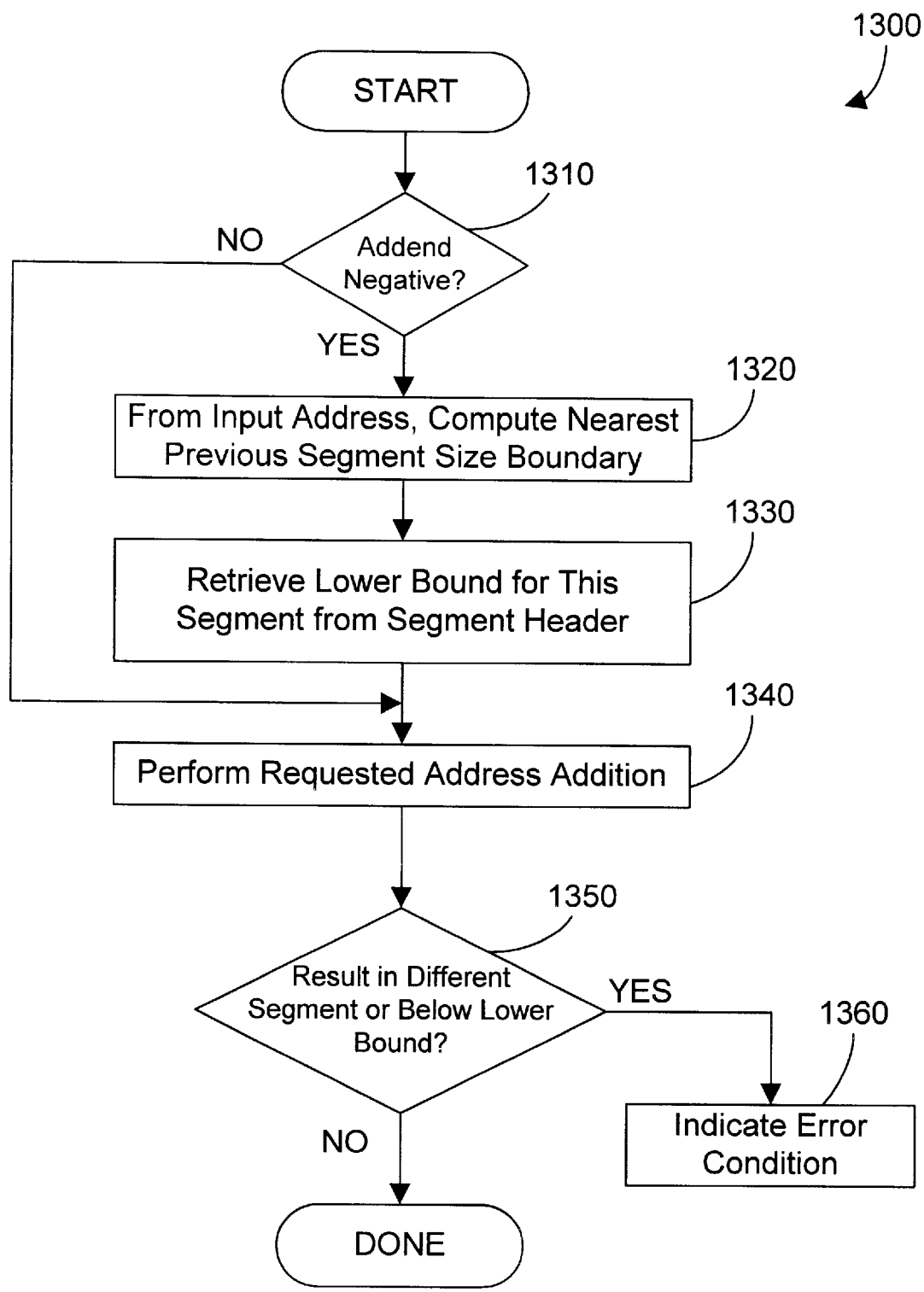
FIG. 13 is a flow diagram of a prior art method for checking address arithmetic in an IBM AS/400 computer system that has 16 MB global segments.
Figure 14:
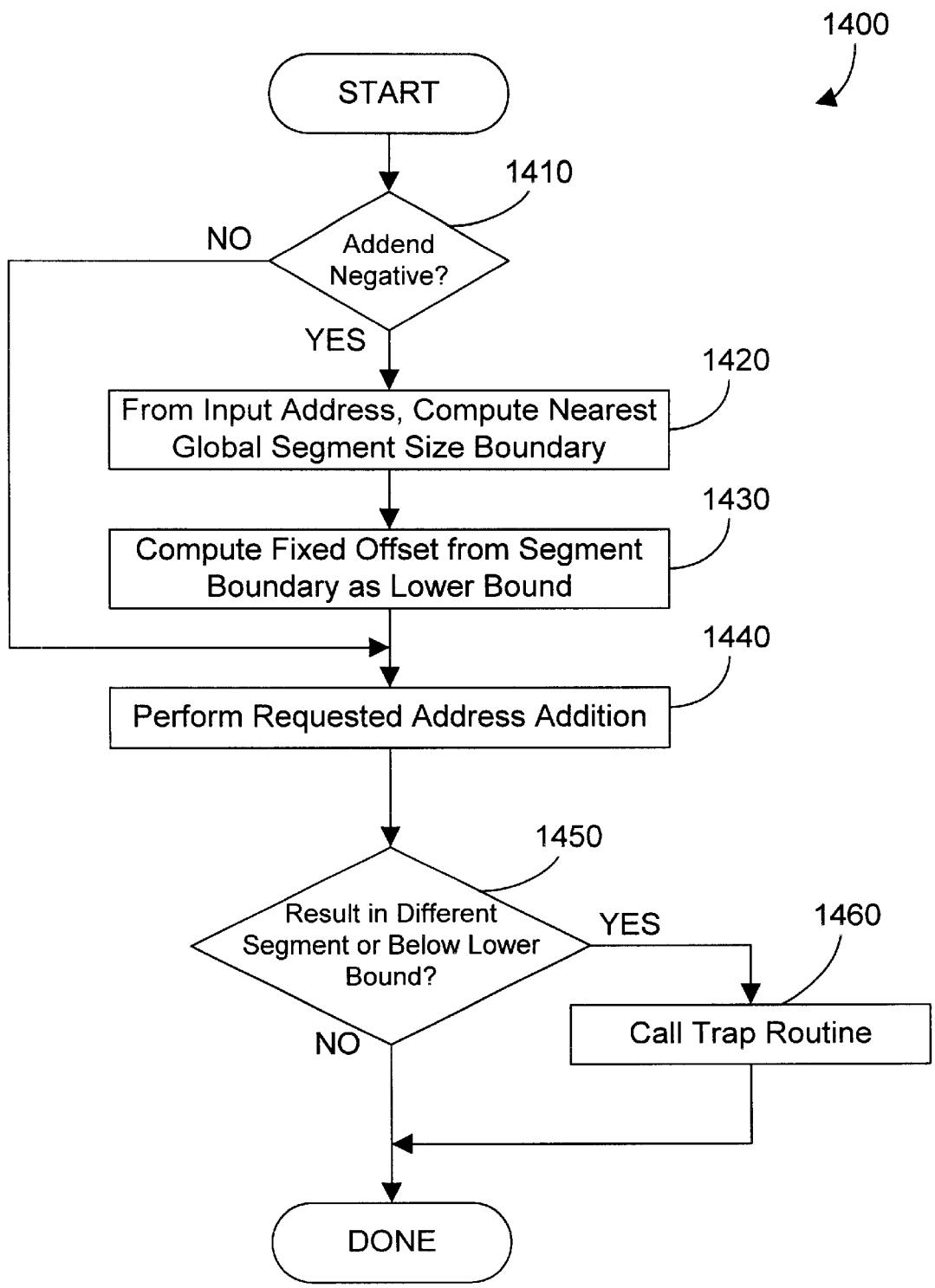
FIG. 14 is a flow diagram of a method for checking address arithmetic in accordance with the preferred embodiments.

In addition to handling page faults and detecting a virtual address overflow and performing an appropriate emulation of the instruction using the virtual address overflow handler 126, address space processor 125 also includes an address arithmetic error processor 127 that detects when an address computation used to compute the value of a pointer results in an address that lies outside of the current 16 MB segment. To understand the function of arithmetic error processor 127, a flow diagram of a prior art method for checking signed address arithmetic is shown in FIG. 13, and the corresponding flow diagram for the preferred embodiments is shown in FIG. 14. Note that FIGS. 13 and 14 assume signed address arithmetic, and unsigned address arithmetic will likely require different steps that will be obvious to one skilled in the art who understands the methods illustrated in FIGS. 13 and 14. Referring now to FIG. 13, a prior art method 1300 for checking address arithmetic begins by determining whether the addend (i.e., the number to be added to an input address) is negative (step 1310). If the addend is negative (step 1310=YES), this means that the result of the address addition will be smaller than the input address. Method 1300 then computes from the input address, which is the address to which the addend is added, the lower bound for the current segment (step 1320). By defining segment boundaries at 16 MB increments in the global address space, step 1320 can easily determine which 16 MB boundary lies below the input address. Next, step 1330 retrieves the lower bound for the addressable portion of this segment from the address 730 stored in the segment header 720 of FIG. 7. As discussed above, this address points to the beginning of the addressable portion, which defines the range of addresses that may be accessed by an application using a space pointer. The requested addition is then performed (step 1340), and the result is then checked to see if it is in a different segment or below the lower bound for the current segment (step 1350). If so (step 1350=YES), an error is then indicated (step 1360).

Otherwise (step 1350=NO), method 1300 is done.

If the addend is not negative (step 1310=NO), this means the result of the address addition will be greater than the input address. The requested address addition is performed (step 1340), and the result is then checked to see if it lies in a different segment (step 1350). If the result is in a different segment (step 1350=YES), method 1300 indicates an error condition (step 1360). If the result is not in a different segment (step 1350=NO), we know that the address is within the addressable portion of the current segment, and method 1300 is done.

Referring now to FIG. 14, in the preferred embodiments, method 1400 represents the steps carried out by the address arithmetic error processor 127 in FIG. 1. First, method 1400 determines whether the addend is negative (step 1410). If so (step 1410=YES), method 1400 takes the input address and computes the nearest lower global segment size boundary (step 1420). In other words, step 1420 finds the lower 16 MB boundary for the input address. Next, a fixed offset is added to the lower boundary to determine the assumed lower bound for the addressable portion (step 1430). In the preferred embodiment, instead of retrieving an address in the segment header that defines the lower bound for the addressable segment, step 1430 assumes a predetermined size for the header to provide a quick check to see if the address might be in the segment header. This predetermined header size is selected so that most segments have headers smaller than this predetermined size. Segment headers that are larger than the assumed predetermined size must be converted or otherwise protected. For the sake of convenience, the predetermined size is selected as 4K, which corresponds to the current page size in the AS/400 computer system. Once the estimated lower bound is determined in step 1430, the requested address addition is performed (step 1440). If the result is less than the assumed lower bound in step 1430 or in a different 16 MB segment (step 1450=YES), the trap routine is then invoked (step 1460) to perform additional processing to determine whether or not the result indicates an addressing error. Otherwise (step 1450=NO), method 1400 ends.

If the addend is not negative (step 1410=NO), this means the result of the address addition will be greater than the input address. The requested address addition is performed (step 1440), and the result is then checked to see if it lies in a different segment (step 1450). If the result is in a different segment (step 1450=YES), the trap routine is then invoked (step 1460) to perform additional processing to determine whether or not the result indicates an addressing error. If the result is not in a different segment (step 1450=NO), we know that the address is within the current segment, and method 1400 is done.

In comparing the flow diagram of method 1400 in FIG. 14 to the flow diagram of method 1300 in FIG. 13, it is evident that one of the significant differences is that what used to be considered an addressing error in the prior art now requires additional processing to see if there really is an address error. This additional processing is needed because the preferred embodiments have added one or more local address spaces in addition to the global address space. The local address space size is preferably a multiple of the segment size of the global address space. In the examples presented herein, the segment size of the global address space is 16 MB, while the segment size of each local address space is 1 TB. Because a valid local address may lie outside the current 16 MB segment, but still be within its defined 1 TB segment, additional processing is needed to determine whether or not the result indicates an addressing error. This additional processing is performed using the trap routine 1460 shown in greater detail in FIG. 15.

Trap routine 1460 begins by determining whether the input address is a global address or a local address (step 1510). If the input address is a global address (step 1510=YES), the nearest lower boundary for the global segment is computed (step 1520). Next, the lower bound for the addressable portion is retrieved from the address field 730 in the segment header 720 (see FIG. 7). This lower bound is the actual lower bound, as opposed to the assumed lower bound in step 1430 of FIG. 14. If the result of the address addition in step 1440 is below the actual lower bound or in a different segment (step 1540=YES), an addressing error is indicated (step 1550). If, however, the result is not below the lower bound and not in a different segment (step 1540=NO), this means that the result is an address that lies somewhere between the actual lower bound retrieved in step 1530 and the assumed lower bound in step 1430, which is a valid global address and will not generate an addressing error. As a result, trap routine 1460 returns (step 1560) without indicating an addressing error.

If the trap routine 1460 determines in step 1510 that the input address is a local address (step 1510=NO), trap routine 1460 determines whether the result of the address addition in step 1440 is within the larger local segment size (step 1570). If so (step 1570=YES), trap routine 1460 returns (step 1560) without indicating an addressing error. However, if the result is outside of the larger local segment size (step 1570=NO), an addressing error is indicated (step 1550).

Figure 15:
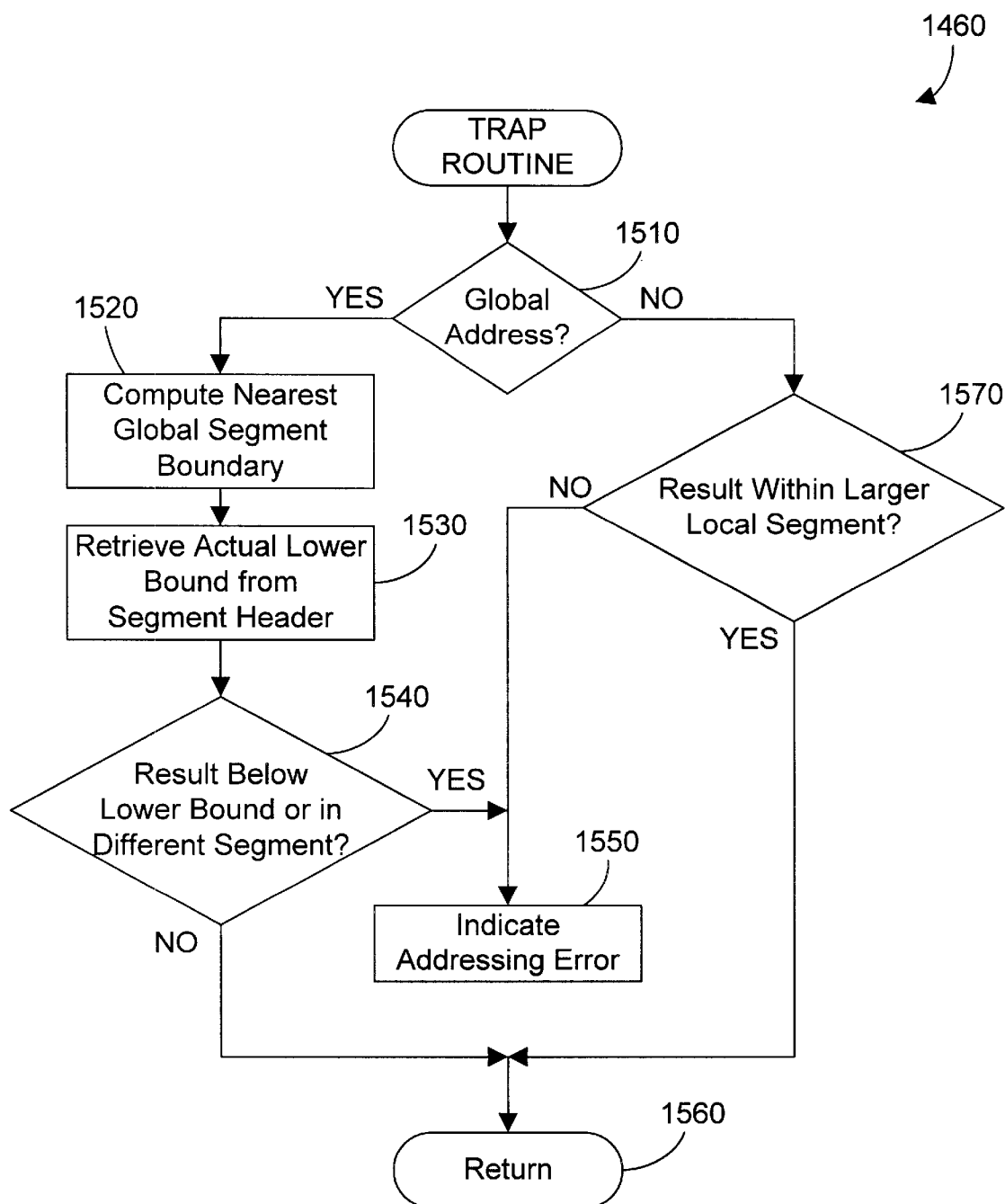
FIG. 15 is a flow diagram of a trap routine that is invoked in step 1460 of FIG. 14.

The trap routine of FIG. 15 essentially takes what was previously an addressing error and checks to see if the error might have been caused by a valid local address. If the potential addressing error is still an error taking the additional local addressing into account, the address error is still indicated. However, if the potential addressing error is caused by a valid local address, no error is indicated.

Another component of the address space processor 125 of FIG. 1 is address space management facility 128. The function of the address space management facility 128 is described below with reference to FIGS. 16–21. Address space management facility 128 presents both a logical and a physical view of the local address space. Referring to FIG. 16, a logical view of a local address space with a defined hierarchy of elements is shown for the purpose of illustration. In the logical view, the local address space is comprised of "members", of which there are two types: 1) regions; and 2) memory objects. Regions serve to contain other members and to provide some grouping or management capabilities. Regions are analogous to a directory hierarchy, where directories can contain files and other directories. The members contained within a region are its "logical children", and the region is their "logical parent". The local address space 220 in FIG. 16 is itself a region, which contains two other regions, a system region 1610 and a user region 1620. Each of these regions 1610 and 1620 may contain other regions and memory objects as desired. For the example shown in FIG. 16, system region 1610 contains another region 1630, which in turn contains a memory object 1640. In addition, the user region 1620 contains two memory objects 1650 and 1660.

Memory objects are used to make storage addressable, and they do this in two primary ways. First, they can map segments from the global address space into the local address space. This feature can be used, for example, to make address ranges that are physically discontiguous in the global address space appear to be contiguous in the local address space. Referring to FIG. 17, the memory object 1650 maps a portion of the global address space 1710 into the local address space.

The second way that memory objects are used to make storage addressable is they can be used to allocate and address physical backing store which is not treated as part of the global address space, and thus create temporary working storage that cannot be viewed by any other process. FIG. 17 illustrates an example of this by having memory object 1660 mapped to a disk allocation 1720 that is not accessible to any other process because it is not given a global address.

In the physical view of the address space management facility 128, the local address space 220 is comprised of ranges of addresses referred to herein as "extents", of which there are two types: 1) container extents, and 2) leaf extents. A container extent serves to contain other extents, which are its "physical children", and to whom it is a "physical parent". A leaf extent cannot be further divided into children. There are two types of leaf extents, "free extents" and "storage extents". Address ranges corresponding to free extents do not address storage, while address ranges corresponding to storage extents may address storage.

Figure 18:
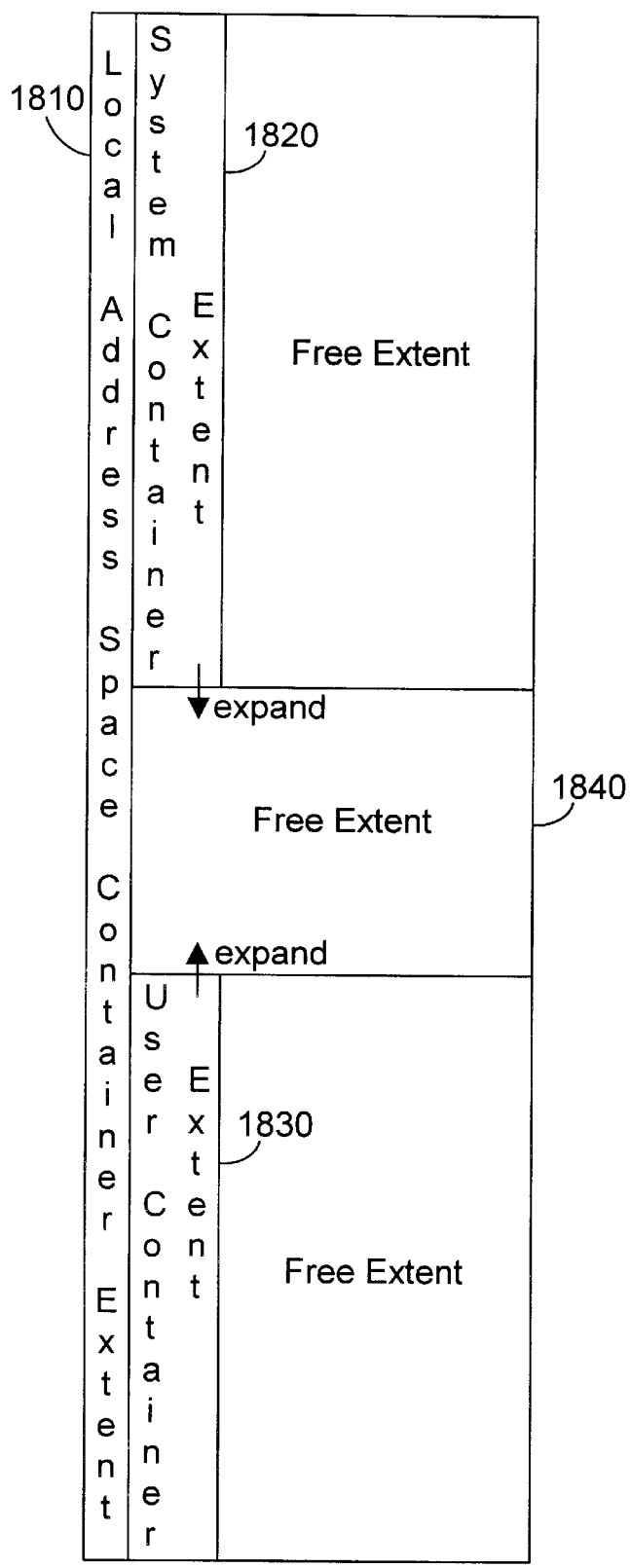
FIG. 18 is a block diagram showing the physical relationship between some of the items in FIG. 16.

A physical view for the local address space 220 in FIG. 16 is shown in FIG. 18. The local address space is a container extent, as shown by 1810 in FIG. 18. This container extent has a child container extent 1820 representing the address ranges that may be used by the system, and a child container extent 1830 representing the address ranges that may be used by a user (such as an application). If it is not necessary to establish a permanent boundary between these two container extents 1820 and 1830, there can be a free extent 1840 between them that can be reduced as the two container extents need to grow towards each other, as shown by the arrows that indicate the expansion of these container extents 1820 and 1830.

Figure 19:
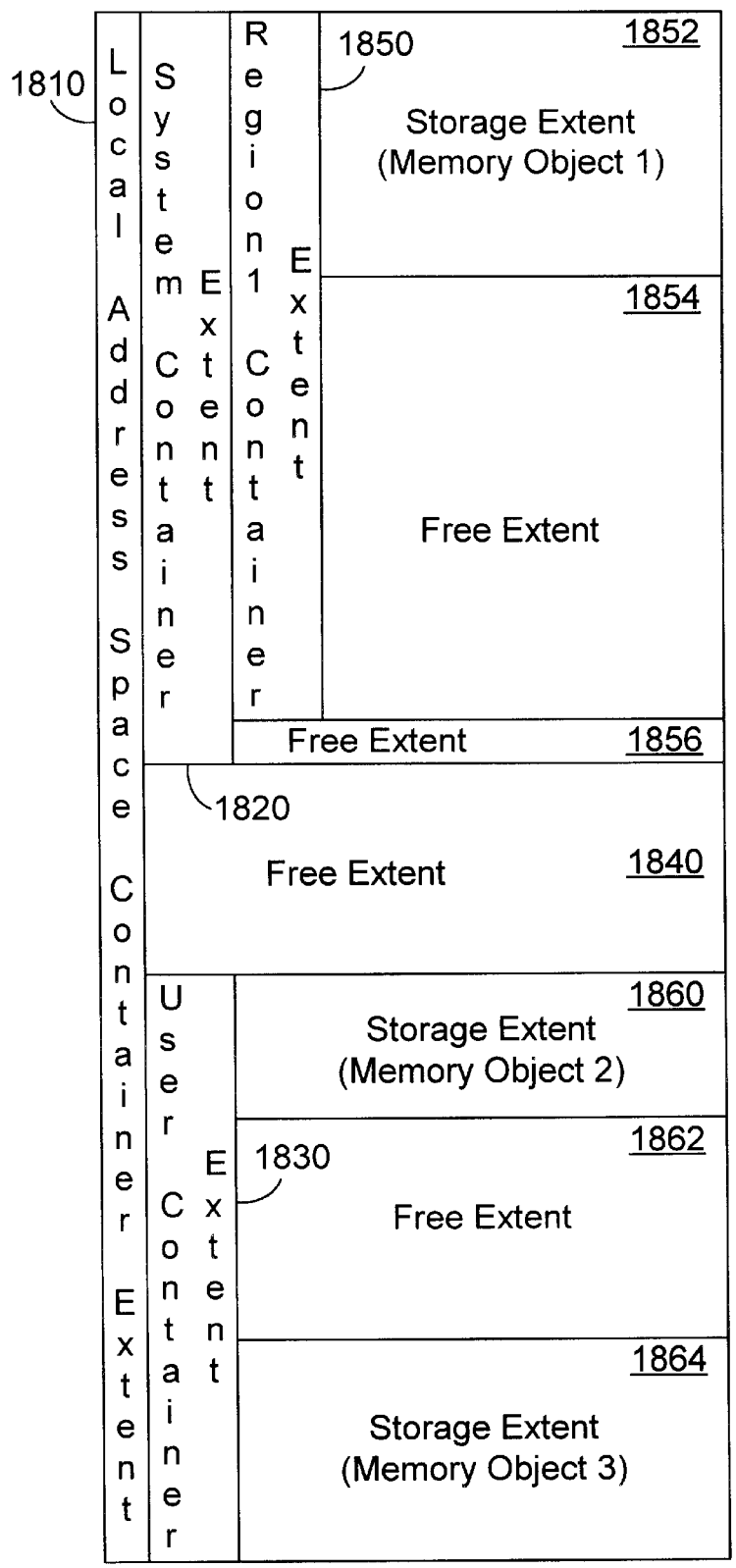
FIG. 19 is a block diagram showing the physical relationship between the various items in FIG. 16.

In the preferred embodiments, a container extent contains one or more child extents, and between the child extents, the address ranges of all child extents exactly cover the address range of the parent container extent. If a container extent is "empty", it must contain a free extent that covers its entire address range. When viewed in this way, every byte of the local address range is associated with exactly one leaf extent. A complete physical view for the local address space 220 in FIG. 16 is illustrated in FIG. 19. The region 1 container extent 1850 is a child extent that contains two leaf extents, a storage extent 1852 for memory object 1 and a free extent 1854. In addition, the system container extent 1820 is also a child extent that contains the region 1 container extent 1850 and a free extent 1856 to occupy all addresses not taken by the container extent 1850. The user container extent 1830 includes three child extents: a storage extent 1860 for memory object 2, a free extent 1862, and a storage extent 1864 for memory object 3.

Figure 20:
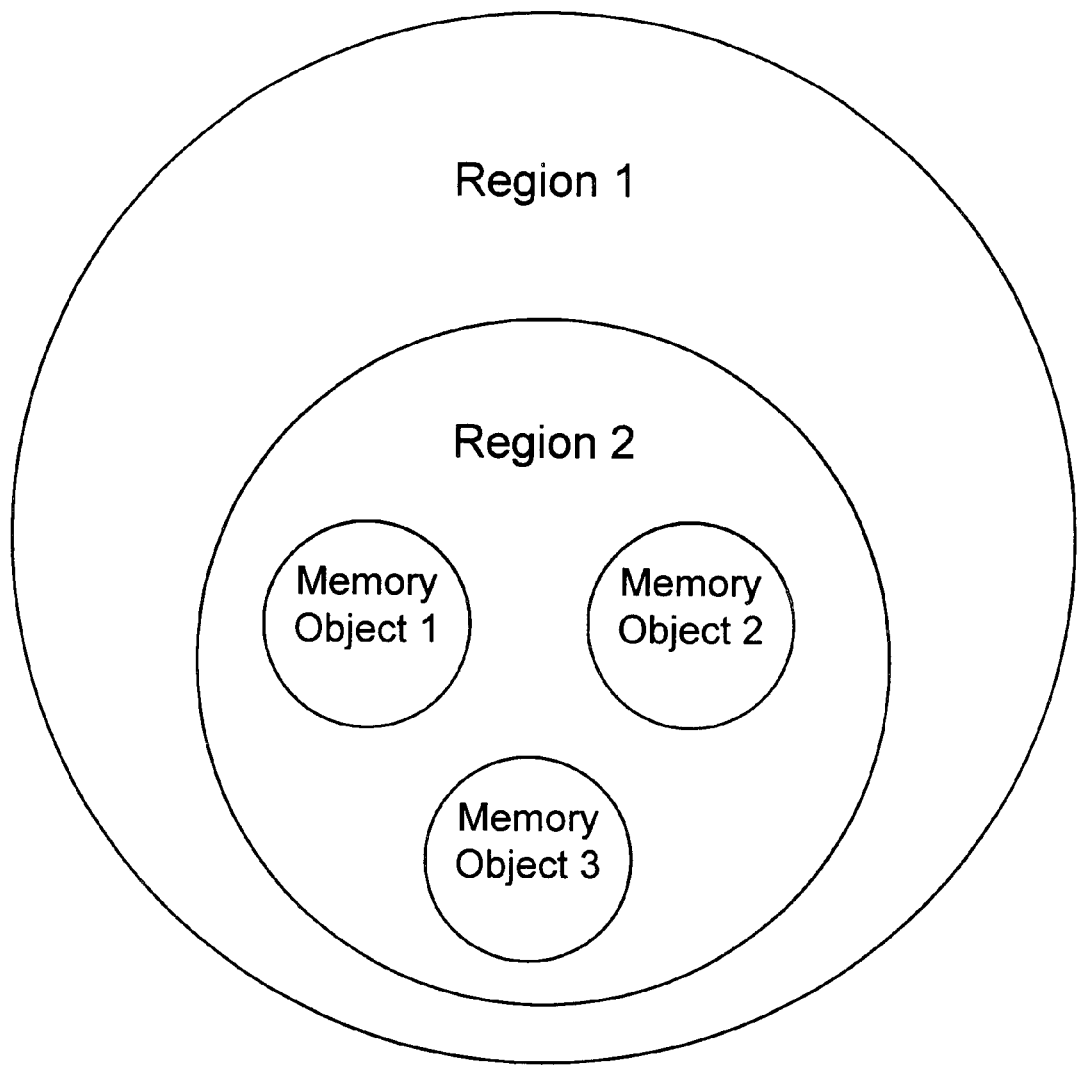
FIG. 20 is a block diagram showing a logical view of items in an address space.
Figure 21:
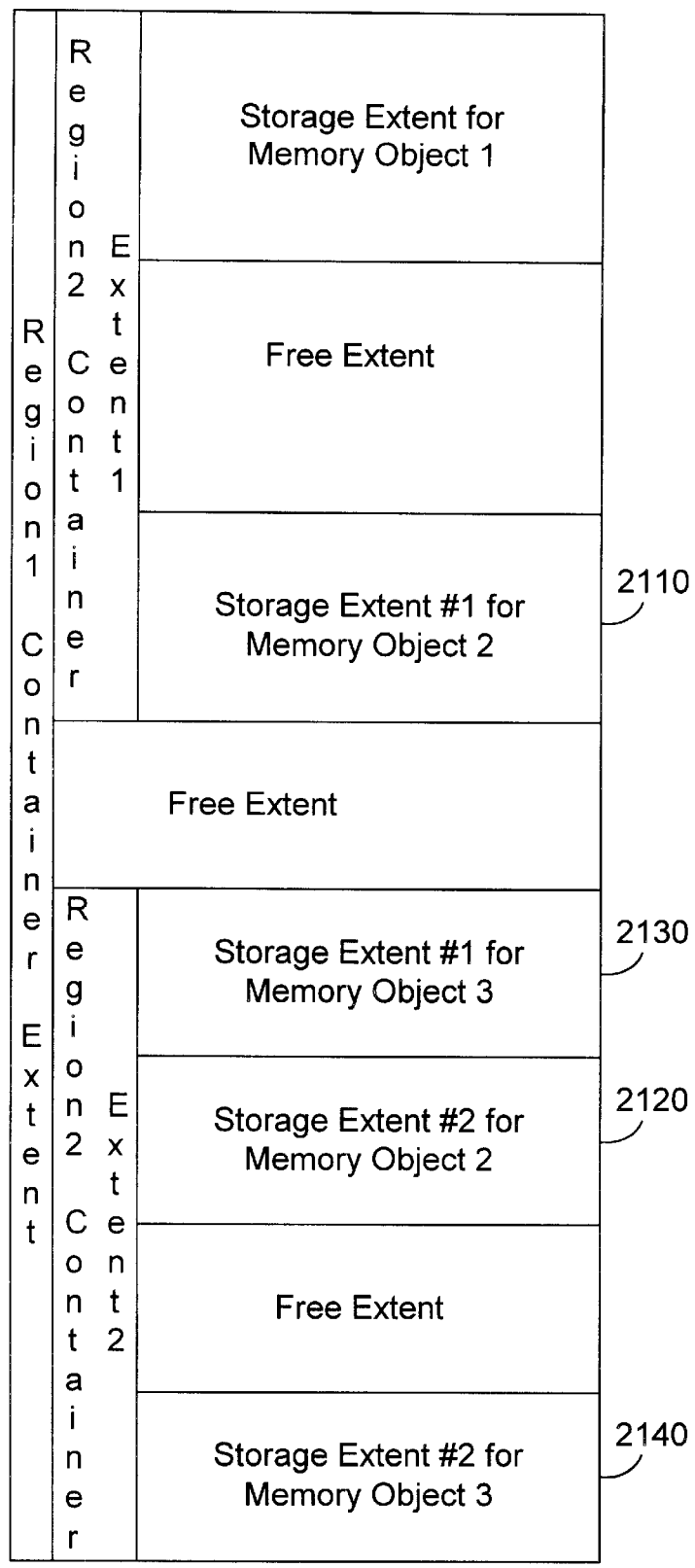
FIG. 21 is a block diagram showing the relationship between the various items in FIG. 20 when multiple extents may represent a single memory object.

The address space management facility 128 uses the physical view (e.g., in FIG. 19) to provide addressability to ranges of addresses, but presents the logical view to the rest of the system. To do this, the address space management facility 128 associates each extent in the physical view with an "owning" member in the logical view. Thus, a container extent is owned by a region, a storage extent is owned by a memory object, and a free extent is owned by the region that owns its physical parent container extent. Furthermore, members in the logical view can be multi-extended. For example, a region may have two or more container extents, representing two or more potentially discontiguous address ranges. Similarly, a memory object may have two or more storage extents, again representing two or more potentially discontiguous address ranges. The fact that in the logical view a member is a child of its logical parent region means that in the physical view, all of the extents owned by that member must be physical children of the container extents that are owned by the logical parent region. Thus, for the logical view in FIG. 20, a corresponding physical view in FIG. 21 shows that memory object 2 and memory object 3 in FIG. 20 are comprised of two extents each. Memory object 2 includes storage extents 2110 and 2120 in FIG. 21, while memory object 3 includes storage extents 2130 and 2140.

There are a variety of advantages that result from defining regions as explained above. For example, a region may be defined that reserves a portion of the address space for future use. Regions make it easier to manage contained regions and memory object, because operations on a region (such as a delete operation) can recursively operate on all regions and memory objects contained within the region. In addition, regions allow the isolation of independent users of the local address space from one another. For example, some application program interfaces (APIs) work strictly with address ranges, and thus have the potential for affecting storage extents for memory objects that do not belong to them. However, by dynamically building a region around all of the address ranges that they map, then any of their other functions (such as changing storage protection) for an arbitrary range of addresses can be constrained to affect only the address ranges where the extents within the region intersect with the specified address range. Finally, regions allow the enforcement of some desired behavior or policy on all memory objects created within a region.

A memory object can be used to affect the addressability or storage protection of its underlying extents, either by explicit requests to the memory object or implicitly through storage access violations that may occur. The addressability or storage protection of the extents are subject to whatever policies or restrictions may apply to the memory object. Some examples of suitable policies and restrictions are now presented.

When explicitly working with a memory object, any addressability or protection changes are constrained to the storage extents of the memory object, thus allowing the memory object to isolate different logical uses of the local address space from one another. When a storage access is made to a page in the address of some leaf extent, but either the page is not addressable or the storage access would violate the hardware storage protection of the page, the member that owns the affected leaf extent can control the handling of the failing access. For example, if an unaddressable page is accessed in a free extent, the owning region's policy might be to simply not do anything to handle the error and let it continue to be surfaced as an exception. However, for an unaddressable page in a storage extent, the owning memory object's policy may be to make the page (and possibly neighboring pages) addressable.

Figure 22:
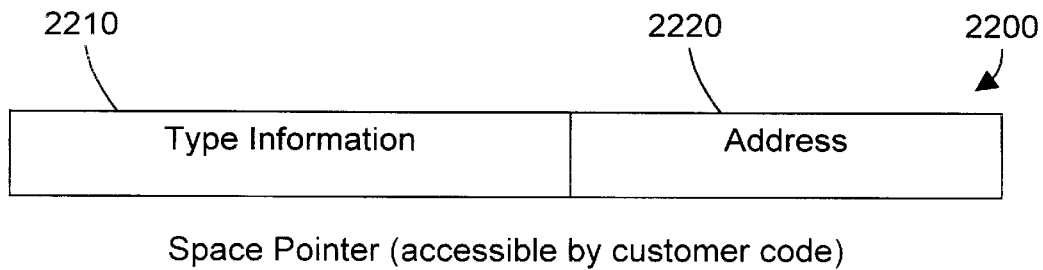
FIG. 22 is a block diagram of a space pointer that is available for a user to access addresses in accordance with the preferred embodiments.
Figure 23:
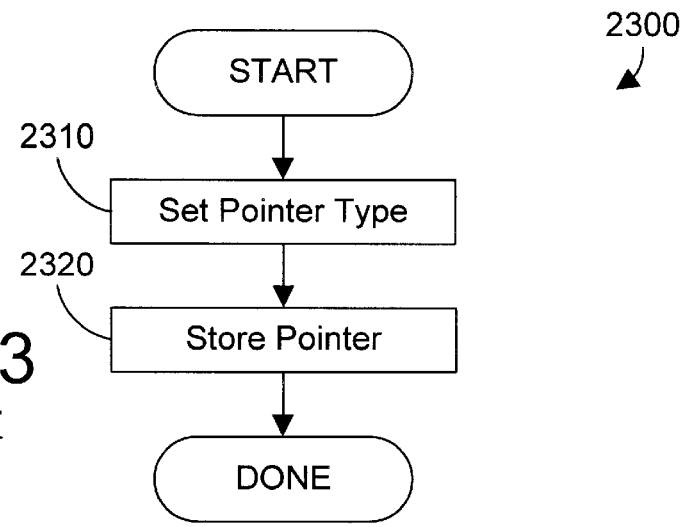
FIG. 23 is a flow diagram of a prior art method for setting a pointer.
Figure 24:
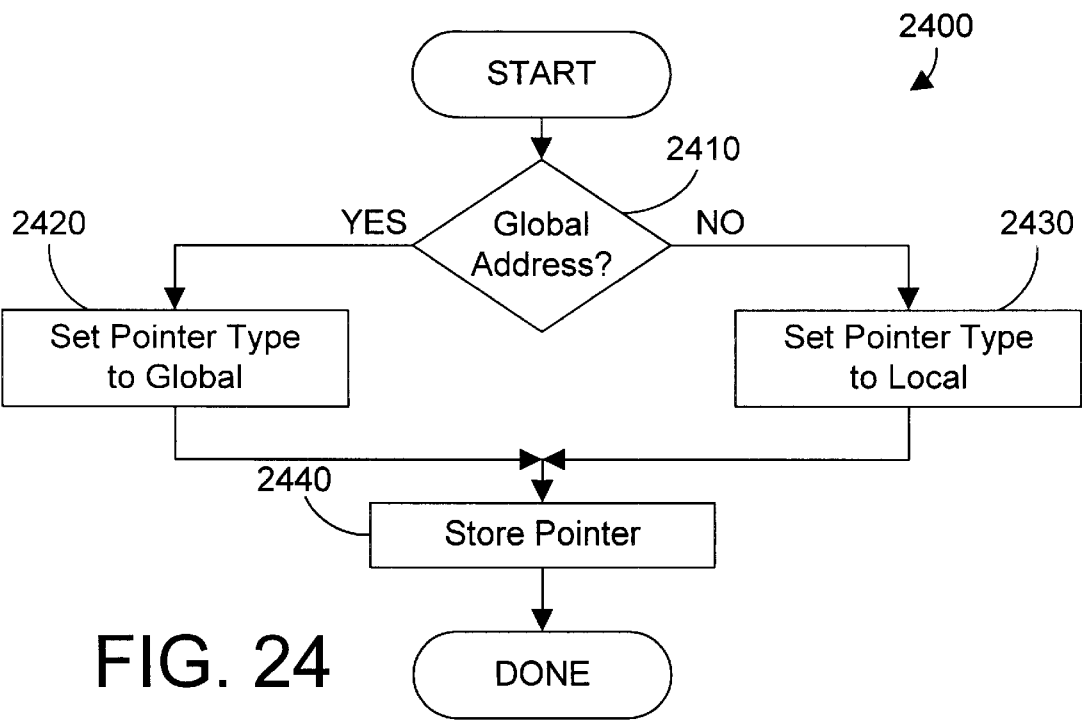
FIG. 24 is a flow diagram of a method for setting a pointer in accordance with the preferred embodiments.

The presence of address space processor 125 of FIG. 1 requires that code generated at compile-time perform generation and checking of space pointers in a new way, as shown in FIGS. 22–26. A space pointer, as described above, provides byte-level accessibility to storage. A suitable space pointer 2200 in accordance with the preferred embodiments is shown in FIG. 22, and includes type information 2210 and an address 2220. The type information 2210 includes information that defines the type of the pointer, while the address 2220 contains the address that the pointer points to. In the prior art AS/400 computer system, there is only one space pointer type defined. As shown in FIG. 23, a prior art method 2300 for creating a space pointer on an AS/400 computer system first sets the pointer type (step 2310), and then stores the type information along with the address in the pointer (step 2320). Referring to FIG. 24, a method 2400 for creating a space pointer on a computer system in accordance with the preferred embodiments first determines whether the address to be written to the pointer is local or global (step 2410). If the address is global (step 2410=YES), the pointer type is set to "space pointer to global" (step 2420), and the type information and address are stored in the pointer (step 2440). If the address is local (step 2410=NO), the pointer type is set to "space pointer to local" (step 2430), and the type information and address are stored in the pointer (step 2440). Method 2400 thus distinguishes over the prior art method 2300 in FIG. 23 by providing two different space pointer types rather than a single space pointer type as taught in the prior art. Thus, programs created before local addressing of the present invention cannot process a local address from a space pointer.

Figure 25:
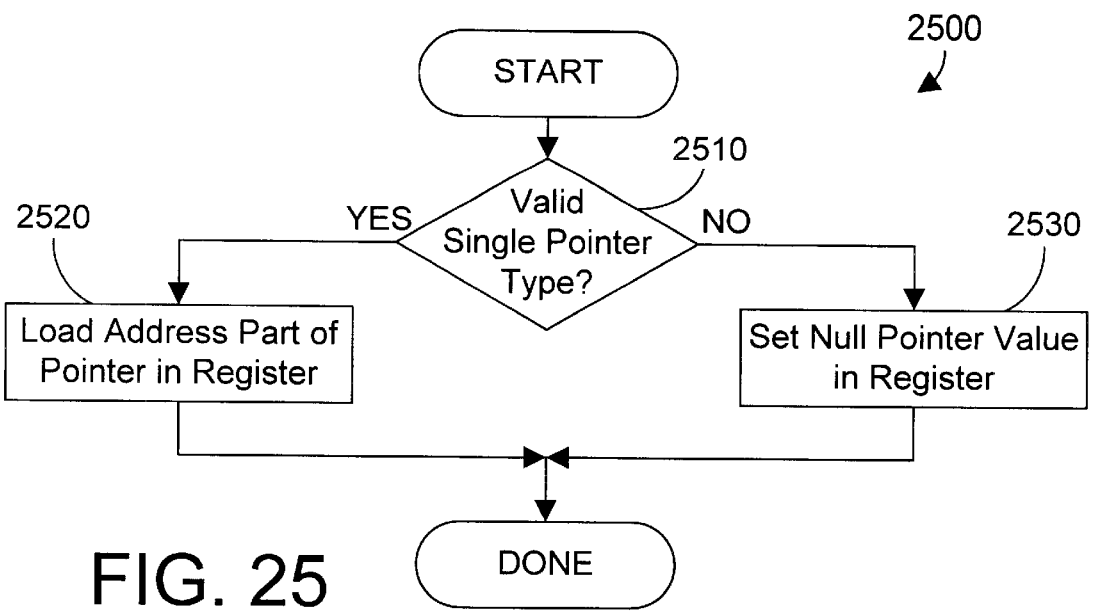
FIG. 25 is a flow diagram of a prior art method for determining whether a pointer is valid.
Figure 26:
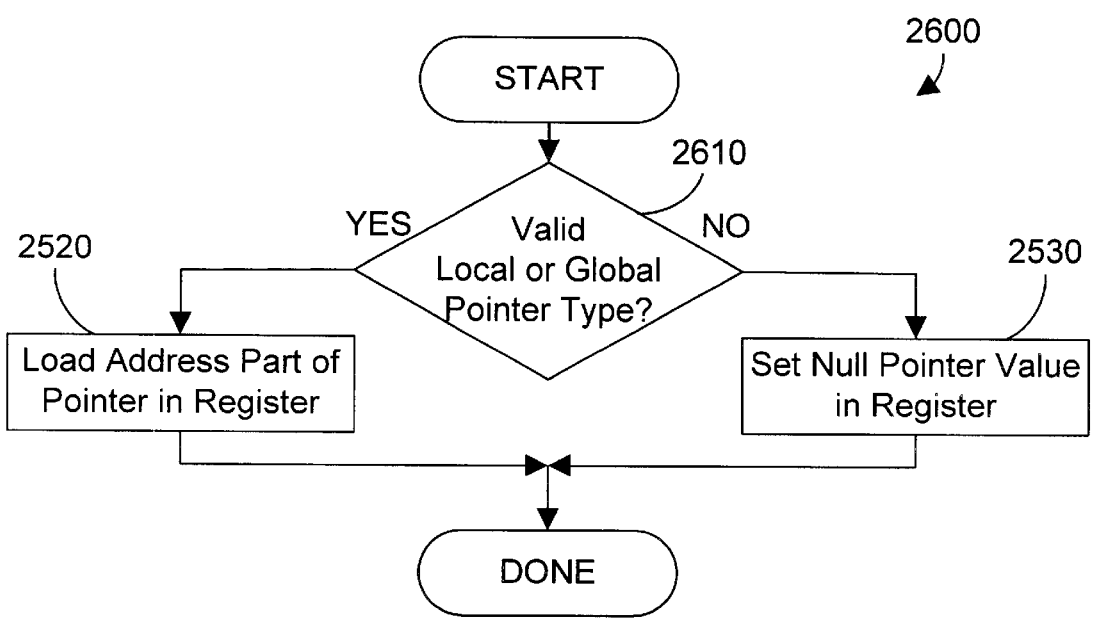
FIG. 26 is a flow diagram of a method for determining whether a pointer is valid in accordance with the preferred embodiments.

As shown in FIG. 25, a prior art method 2500 for determining whether a pointer is valid begins by reading the type information, and determining whether the type information corresponds to the single space pointer type previously defined on the AS/400 computer system (step 2510). If the pointer type is valid (step 2510=YES), the address 2220 of the pointer is loaded into a register (step 2520). If the pointer type is not valid (step 2510=NO), a null pointer value is set in the register (step 2530) to indicate an error in the pointer. Note that the error could also be indicated by throwing an exception, or in any other suitable way.

A method 2600 for checking a pointer in accordance with the preferred embodiments is similar to method 2500 of FIG. 25, but must check to see if the pointer corresponds to either a "space pointer to global" type or a "space pointer to local" type. Thus, in step 2610, the pointer is checked against the two defined pointer types. If the pointer is valid (step 2610=YES), the address 2220 of the pointer is loaded into a register (step 2520). If the pointer type is not either of the valid space pointer types (i.e., global and local), (step 2610=NO), a null pointer value is set in the register (step 2530) to indicate an error in the pointer. All suitable ways of indicating an error in the pointer are within the scope of the preferred embodiments.

Figure 27:
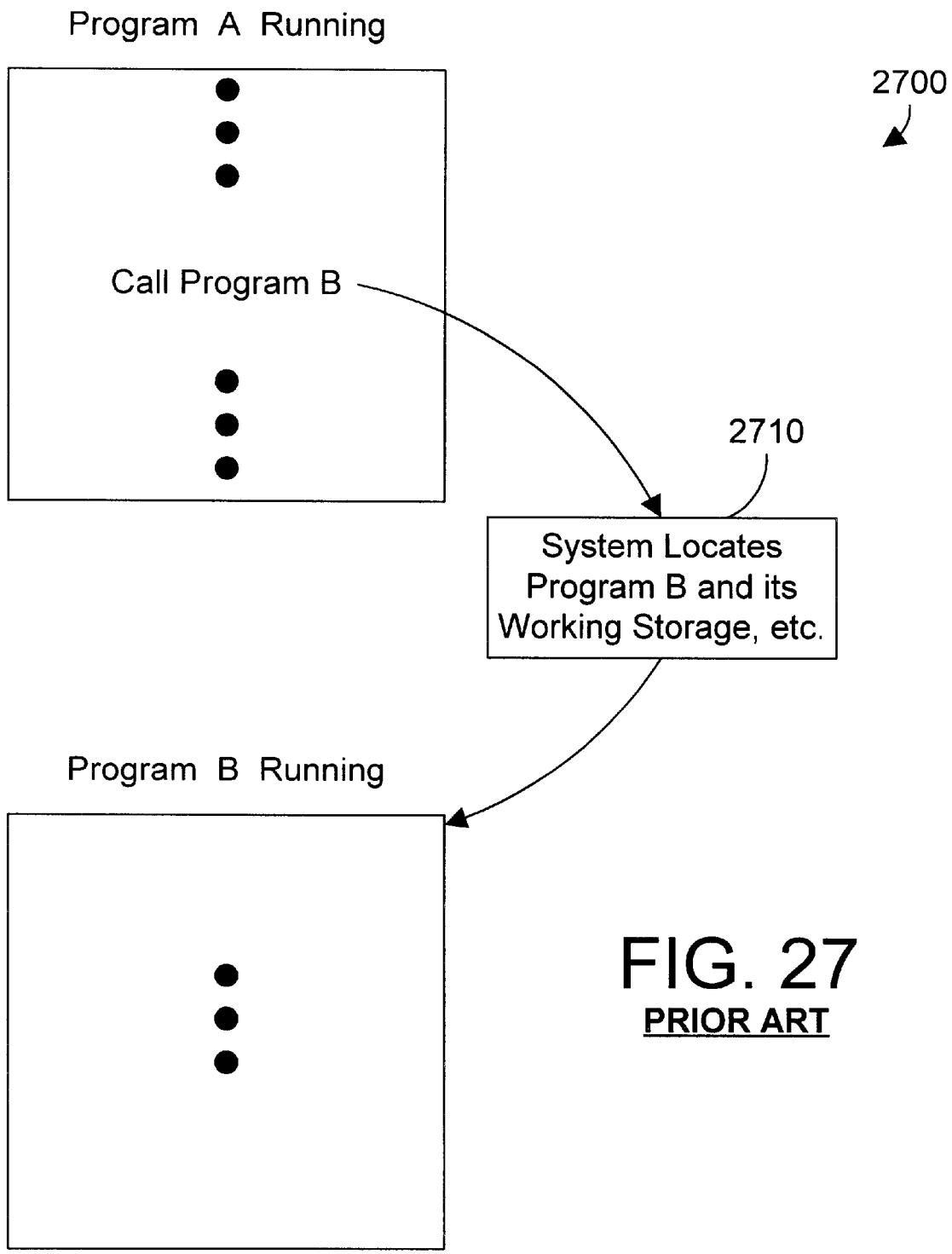
FIG. 27 is a flow diagram showing a prior art method for passing control to a called program.
Figure 28:
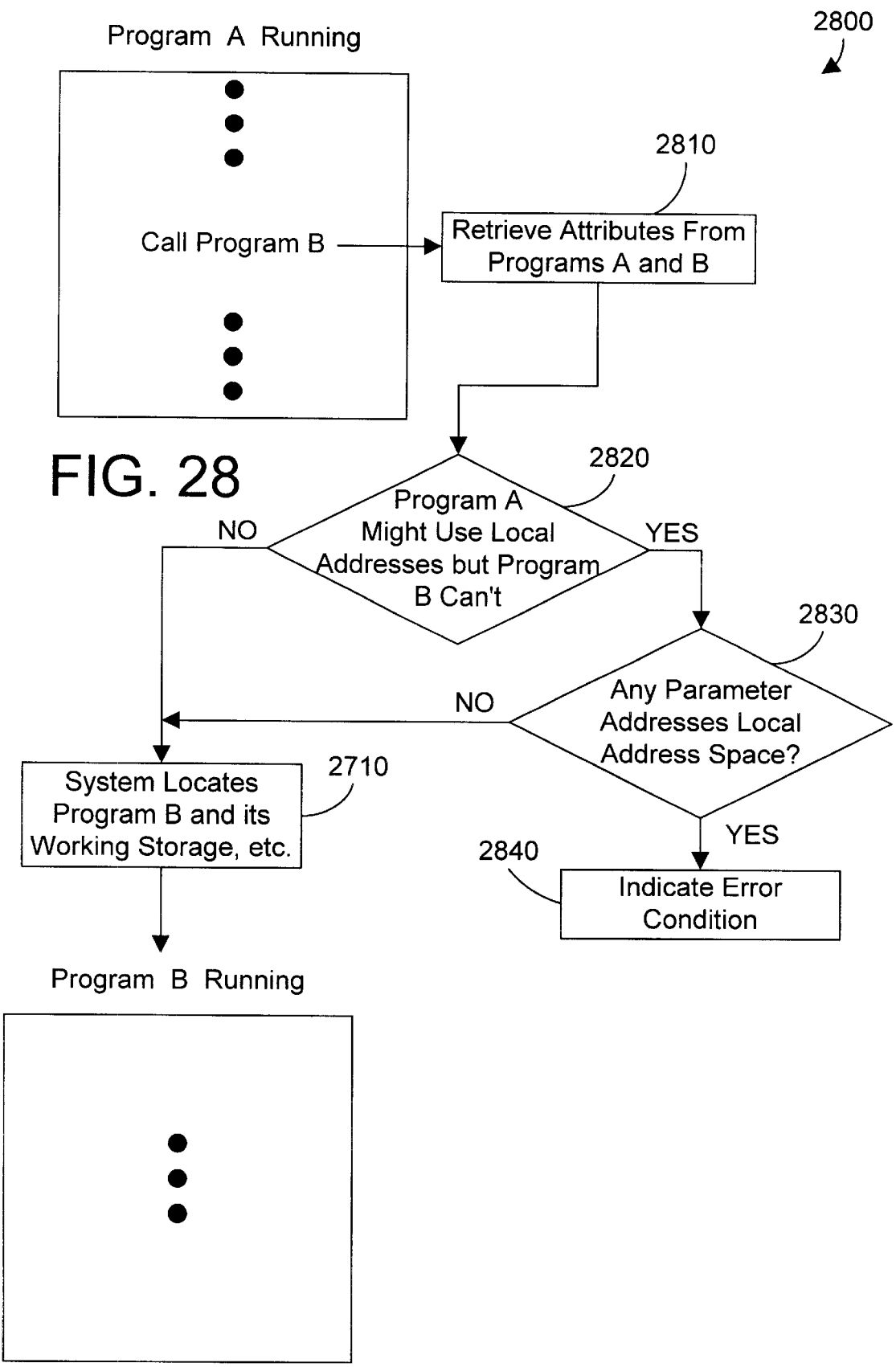
FIG. 28 is a flow diagram of a method for conditionally passing control to a called program in accordance with the preferred embodiments.

As shown in FIG. 1, address space processor 125 includes a compatibility checker 129 that dynamically determines at run-time whether calling code can pass control to called code. Calling code refers herein to any portion of a program that makes a call to a procedure or a call to another program, referred to herein as called code. Referring to FIG. 27, program A is executing and calls program B, so program A is the calling code, and program B is the called code. In the prior art method 2700, when program A calls program B, the system (meaning the operating system 123 of FIG. 1) locates program B and its working storage, and then passes control to program B. However, a program that uses local addresses in accordance with the preferred embodiments may call a program that does not recognize local addresses, and a way must be provided to check the compatibility of the addressing capability of the called code when compared to the addressing capability of the calling code. Compatibility checker 129 in FIG. 1 performs this dynamic checking each time calling code invokes called code, as shown by method 2800 of FIG. 28.

When program A calls program B, the compatibility checker 129 first retrieves attributes for program A and for program B that indicate the addressing capabilities of each code portion (step 2810). If program A is a program that uses both local and global addresses in accordance with the preferred embodiments, but program B is a prior art program that does not recognize local addresses (step 2820=YES), we now must check to see if any of the passed parameters are local addresses (step 2830). If any passed parameter is a local address (step 2830=YES), method 2800 indicates an error condition (step 2840). Note that an error condition is only indicated if: 1) the addressing capabilities of the two create a potential conflict (step 2820=YES) AND an actual conflict occurs (step 2830=YES). If the addressing capability of the two programs are compatible (step 2820=NO), or if the addressing capability of the two programs are incompatible but no local addresses are passed (step 2830=NO), the system locates program B and its working storage, then passes control to program B (step 2710), just as is done in the prior art method 2700 in FIG. 27.

Compatibility checker 129 can also check for compatibility with called procedures, as shown by the sample implementation in FIGS. 29–31. For the discussion herein, we assume that the relevant called code portions are procedures, and that each procedure is accessed using a procedure pointer that has type information and an address, similar to the space pointer 2200 in FIG. 22. Within the type information of the procedure pointer is an addressing mask. An example of a portion of an addressing mask that is defined in a prior art AS/400 computer system is shown as mask 2930 of FIG. 29. This mask is used to indicate whether a particular register will contain an address when the call is performed. If the bit value is one, there will be an address in the corresponding register. Thus, from the mask value in FIG. 29, there will be addresses stored in registers K+1 and K+3. Note that the mask 2930 includes a bit that is unused, and therefore always has a zero value in the prior art implementation.

An addressing mask 3030 as shown in FIG. 30 in accordance with the preferred embodiments preferably uses the unused bit of the prior art mask 2930 to indicate whether a procedure is passing a parameter that could contain a local address. If this bit is set to one, the procedure could pass a local address. If this bit is set to zero, this indicates that the procedure can only pass global addresses or is not passing addresses. Referring now to FIG. 31, a method 3100 is preferably performed by compatibility checker 129, and begins by retrieving the addressing mask from the procedure pointer to the procedure being called and the mask that corresponds to the caller's view of the procedure being called (step 3110). These masks are compared to determine whether the addressing capabilities of the two are compatible (step 3120). If the two are compatible (step 3120=YES), the procedure call is performed (step 3130). If the two are not compatible (step 3120=NO), an error condition is indicated (step 3140). In this manner, compatibility checker 129 allows new programs that include both local and global addressing to interact with older programs that have only global addressing if the addressing modes are compatible or if no local addresses are passed as parameters.

In addition to run-time checking, compatibility checker 129 may also perform compatibility checks at bind-time and at activation-time. Compatibility checker 129 can be invoked whenever a reference to a procedure can be resolved, be it at bind-time, activation-time, or run-time. In sum, compatibility checker 129 can perform all suitable tests required to assure that new programs that take advantage both global and local addressing in accordance with the preferred embodiments may interact with older programs when compatible. In addition, other compatibility checks can be performed outside of the compatibility checker 129 for special cases as well. For example, if a program can pass a local address to the operating system that potentially could be passed back to an old program in a register, the operating system could refuse to accept the local address. These and other suitable compatibility checks are within the scope of the preferred embodiments.

By providing both local and global addressing capabilities at the same time, the flexibility of a computer system implemented in accordance with the preferred embodiments is greatly increased. Such a system with dual addressing capabilities enjoys the benefits of both addressing schemes while minimizing the drawbacks. If data needs to be available to other processes, it can be stored in global address space and can then be accessed without the overhead of a local addressing scheme. If data is local to a process, a much larger contiguous view is possible, as are multiple mappings of the same memory. When added in such a way that previously-created programs do not have to be re-created to co-exist on the same computer system, the enhanced capabilities of the present invention are even more valuable.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:

at least one processor;

a memory coupled to the at least one processor;

a global address space that may be accessed by the at least one processor via a plurality of global addresses;

a local address space that may be accessed by the at least one processor via a plurality of local addresses;

a process executed by the at least one processor;

a hardware address translation mechanism coupled to the at least one processor that indicates an addressing error when an address generated by the process crosses a predefined boundary for the global address space; and an address space processor residing in the memory and executed by the at least one processor that operates in response to the indication of the addressing error from the hardware address translation mechanism, and in response thereto, dynamically determines whether the address generated by the process is a global address or a local address, and that indicates an addressing error if the address generated by the process is a global address, and if the address generated by the process is a local address, the address space processor determines whether the address generated by the process accesses the local address space, and if the address generated by the process does not access the local address space, indicating an addressing error to the process, and if the address generated by the process accesses the local address space, allowing the process to access the address.

2. The apparatus of claim 1 wherein the address space processor further comprises an address space management facility residing in the memory and executed by the at least one processor that presents and correlates a logical and a physical view of addresses in a local address space.

3. The apparatus of claim 1 wherein the local address space has a size that is a predetermined multiple of the size of a segment in the global address space.

4. An apparatus comprising:

at least one processor;

a memory coupled to the at least one processor;

a global address space that may be accessed by the at least one processor via a plurality of global addresses;

a local address space that may be accessed by the at least one processor via a plurality of local addresses;

a process executed by the at least one processor; and an address space processor residing in the memory and executed by the at least one processor that dynamically determines whether an address generated by the process is a global address or a local address, and that determines whether a generated global address lies within first predetermined boundaries for global addresses and that determines whether a generated local address lies within second predetermined boundaries for local addresses, wherein the address space processor comprises a virtual address overflow handler that emulates an instruction that generates an "out of range" condition in the hardware address translation mechanism using at least one instruction that does not generate an "out of range" condition in the hardware address translation mechanism when the address is a local address that lies within the second predetermined boundaries.

5. An apparatus comprising:

at least one processor;

a memory coupled to the at least one processor;

a global address space that may be accessed by the at least one processor via a plurality of global addresses;

a local address space that may be accessed by the at least one processor via a plurality of local addresses;

a process executed by the at least one processor; and an address space processor residing in the memory and executed by the at least one processor that dynamically determines whether an address generated by the process is a global address or a local address, and that determines whether a generated global address lies within first predetermined boundaries for global addresses and that determines whether a generated local address lies within second predetermined boundaries for local addresses, wherein the address space processor comprises a compatibility checker that checks compatibility of addressing capability of a first program portion and addressing capability of a second program portion that is invoked by the first program portion and that allows the first program portion to invoke the second program portion only if the addressing capability of the second program portion is compatible with the addressing capability of the first program portion.

6. The apparatus of claim 5 wherein the addressing capability of the first program portion is compatible with the addressing capability of the second program portion if the first program portion cannot pass a local address to the second program portion.

7. The apparatus of claim 5 wherein the addressing capability of the first program portion is compatible with the addressing capability of the second program portion if the first program portion can pass a local address to the second program portion but does not pass any local address in a current call to the second program portion.

8. The apparatus of claim 5 wherein the compatibility checker checks at bind-time the addressing compatibility of program portions that access addresses that can be resolved at bind-time, and indicates an error if an addressing incompatibility exists.

9. The apparatus of claim 5 wherein the compatibility checker checks at activation-time the addressing compatibility of program portions that access addresses that cannot be resolved at bind-time but can be resolved at activation-time, and indicates an error if an addressing incompatibility exists.

10. The apparatus of claim 5 wherein the compatibility checker checks at run-time the addressing compatibility of program portions that accesses addresses that cannot be resolved at bind-time and that cannot be resolved at activation-time, and refuses at run-time to pass control to an incompatible called program if an addressing incompatibility exists.

11. A method for providing simultaneous local and global addressing on a computer system, the method comprising the steps of:

defining a local address space that defines a plurality of local addresses;

defining a global address space that defines a plurality of global addresses and a plurality of global segments;

determining a virtual address from a base address;

determining whether the base address is a global address or a local address;

if the base address is a global address, determining whether the virtual address lies within first predetermined global segment boundaries that define a global segment that includes the first address;

if the virtual address lies outside the first predetermined global segment boundaries, indicating an addressing error;

in response to the indicated addressing error, determining whether the virtual address accesses the local address space;

if the virtual address does not access the local address space, indicating an addressing error; and if the virtual address accesses the local address space, allowing access to the address.

12. The method of claim 11 further comprising the steps of:

checking at bind-time the addressing compatibility of program portions that access addresses that can be resolved at bind-time; and indicating an error if an addressing incompatibility exists.

13. The method of claim 11 further comprising the steps of:

checking at activation-time the addressing compatibility of program portions that access addresses that cannot be resolved at bind-time but can be resolved at activation-time; and indicating an error if an addressing incompatibility exists.

14. The method of claim 11 further comprising the steps of:

checking at run-time the addressing compatibility of program portions that access addresses that cannot be resolved at bind-time and that cannot be resolved at activation-time; and refusing at run-time to pass control to an incompatible called program portion if an addressing incompatibility exists.

15. The method of claim 11 further comprising the steps of:

generating a plurality of pointers to global addresses and a plurality of pointers to local addresses, each pointer having an associated type, wherein the associated type includes a global type and a local type; and checking the type of each pointer when used to assure that a global type pointer contains a global address and a local type pointer contains a local address.

16. The method of claim 11 further comprising the steps of: presenting and correlating a logical and a physical view of addresses in a local address space.

17. The method of claim 11 wherein the local address space has a size that is a predetermined multiple of the size of a global segment.

18. A method for providing simultaneous local and global addressing on a computer system, the method comprising the steps of:

defining a local address space that defines a plurality of local addresses;

defining a global address space that defines a plurality of global addresses and a plurality of global segments;

determining a virtual address from a base address;

determining whether the base address is a global address or a local address;

if the base address is a global address, determining whether the virtual address lies within first predetermined global segment boundaries that define a global segment that includes the first address;

if the virtual address is a local address, determining whether the virtual address lies within second predetermined boundaries that define a local segment that includes the first address; and emulating an instruction that generates an "out of range" condition using at least one instruction that does not generate an "out of range" condition.

19. A method for providing simultaneous local and global addressing on a computer system, the method comprising the steps of:

defining a local address space that defines a plurality of local addresses;

defining a global address space that defines a plurality of global addresses and a plurality of global segments;

determining a virtual address from a base address;

determining whether the base address is a global address or a local address;

if the base address is a global address, determining whether the virtual address lies within first predetermined global segment boundaries that define a global segment that includes the first address;

if the virtual address is a local address, determining whether the virtual address lies within second predetermined boundaries that define a local segment that includes the first address; and handling page faults for global addresses differently than page faults for local addresses.

20. A method for providing simultaneous local and global addressing on a computer system, the method comprising the steps of:

defining a local address space that defines a plurality of local addresses;

defining a global address space that defines a plurality of global addresses and a plurality of global segments;

determining a virtual address from a base address;

determining whether the base address is a global address or a local address;

if the base address is a global address, determining whether the virtual address lies within first predetermined global segment boundaries that define a global segment that includes the first address;

if the virtual address is a local address, determining whether the virtual address lies within second predetermined boundaries that define a local segment that includes the first address;

checking compatibility of addressing capability of a first program portion and addressing capability of a second program portion that is invoked by the first program portion; and allowing the first program portion to invoke the second program portion only if the addressing capability of the second program portion is compatible with the addressing capability of the first program portion.

21. The method of claim 20 wherein the addressing capability of the first program portion is compatible with the addressing capability of the second program portion if the first program portion cannot pass a local address to the second program portion.

22. The method of claim 20 wherein the addressing capability of the first program portion is compatible with the addressing capability of the second program portion if the first program portion can pass a local address to the second program portion but does not pass any local address.

23. In a computer system that has a local address space of a predetermined size and a global address space divided into a predetermined number of global segments, wherein the predetermined size of the local address space is a predetermined multiple of the size of a global segment, the computer system including a hardware address translation mechanism that generates an addressing error indication when an address calculation on a base address causes the result to lie outside a current segment that is the size of the global segment, a method for detecting in software when the address is a valid address to the local address space, the method comprising the steps of:

determining whether the base address is a global address or a local address;

determining whether the result is in the same segment as the base address, wherein the segment has first predetermined boundaries if the base address is a global address and second predetermined boundaries if the base address is a local address;

if the result is not in the same segment as the base address, indicating an addressing error to the process that performed the address calculation;

if the result is in the same segment as the base address, allowing the process to access to the result address.

24. A program product comprising:

an address space processor that operates in response to the indication of the addressing error from a hardware address translation mechanism, and in response thereto, dynamically determines whether an address generated by a process in a computer system is a global address or a local address, and that indicates an addressing error if the address generated by the process is a global address, and if the address generated by the process is a local address, the address space processor determines whether the address generated by the process accesses a local address space, and if the address generated by the process does not access the local address space, indicating an addressing error to the process, and if the address generated by the process accesses the local address space, allowing the process to access the address; and computer readable signal bearing media bearing the address space processor.

25. The program product of claim 24 wherein the signal bearing media comprises recordable media.

26. The program product of claim 24 wherein the signal bearing media comprises transmission media.

27. The program product of claim 24 wherein the address space processor further comprises an address space management facility that presents and correlates a logical and a physical view of addresses in a local address space.

28. The program product of claim 24 wherein the local address space has a size that is a predetermined multiple of the size of a segment in the global address space.

29. A program product comprising:

an address space processor that operates in response to the indication of the addressing error from a hardware address translation mechanism, and in response thereto, dynamically determines whether an address generated by a process in a computer system is a global address or a local address, and that determines whether a computed global address lies within first predetermined boundaries for global addresses and that determines whether a computed local address lies within second predetermined boundaries for local addresses, wherein the address space processor comprises a virtual address overflow handler that emulates an instruction that generates an "out of range" condition in the hardware address translation mechanism using at least one instruction that does not generate an "out of range" condition in the hardware address translation mechanism when the address is a local address that lies within the second predetermined boundaries; and computer readable signal bearing media bearing the address space processor.

30. A program product comprising:

an address space processor that operates in response to the indication of the addressing error from a hardware address translation mechanism, and in response thereto, dynamically determines whether an address generated by a process in a computer system is a global address or a local address, and that determines whether a computed global address lies within first predetermined boundaries for global addresses and that determines whether a computed local address lies within second predetermined boundaries for local addresses, wherein the address space processor comprises a compatibility checker that checks compatibility of addressing capability of a first program portion and addressing capability of a second program portion that is invoked by the first program portion and that allows the first program portion to invoke the second program portion only if the addressing capability of the second program portion is compatible with the addressing capability of the first program portion; and computer readable signal bearing media bearing the address space processor.

31. The program product of claim 30 wherein the addressing capability of the first program is compatible with the addressing capability of the second program if the first program cannot pass a local address to the second program.

32. The program product of claim 30 wherein the addressing capability of the first program is compatible with the addressing capability of the second program if the first program can pass a local address to the second program but does not pass any local address in a current call to the second program portion.

33. The program product of claim 30 wherein the compatibility checker checks at bind-time the addressing compatibility of program portions that access addresses that can be resolved at bind-time, and indicates an error if an addressing incompatibility exists.

34. The program product of claim 30 wherein the compatibility checker checks at activation-time the addressing compatibility of program portions that access addresses that cannot be resolved at bind-time but can be resolved at activation-time, and indicates an error if an addressing incompatibility exists.

35. The program product of claim 30 wherein the compatibility checker checks at run-time the addressing compatibility of program portions that accesses addresses that cannot be resolved at bind-time and that cannot be resolved at activation-time, and refuses at run-time to pass control to an incompatible called program if an addressing incompatibility exists.

* * * * *